United States Patent
Wu et al.

(10) Patent No.: US 8,107,149 B2
(45) Date of Patent: Jan. 31, 2012

(54) NEGATIVE INDEX MATERIAL-BASED MODULATORS AND METHODS FOR FABRICATING THE SAME

(75) Inventors: Wei Wu, Palo Alto, CA (US); Alexandre M. Bratkovski, Mountain View, CA (US); Shih-Yuan Wang, Palo Alto, CA (US); Jingjing Li, Palo Alto, CA (US); Qiangfei Xia, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 12/387,169

(22) Filed: Apr. 29, 2009

(65) Prior Publication Data

US 2010/0277789 A1 Nov. 4, 2010

(51) Int. Cl.
*G02B 26/00* (2006.01)
*G02F 1/01* (2006.01)
(52) U.S. Cl. ........ 359/237; 359/276; 359/279; 977/762; 977/932; 977/949; 977/950
(58) Field of Classification Search .......... 359/276, 359/254, 259, 279, 237; 977/762, 932, 949, 977/950
See application file for complete search history.

(56) References Cited

U.S. PATENT DOCUMENTS

| 7,064,883 | B2 * | 6/2006 | Payne et al. | 359/290 |
| 7,570,409 | B1 * | 8/2009 | Wang et al. | 359/237 |

* cited by examiner

*Primary Examiner* — Jack Dinh

(57) ABSTRACT

Various embodiments of the present invention are directed to external, electronically controllable, negative index material-based modulators. In one aspect, an external modulator comprises a negative index material in electronic communication with an electronic signal source. The negative index material receives an electronic signal encoding data from the electronic signal source and an unmodulated carrier wave from an electromagnetic radiation source. Magnitude variations in the electronic signal produce corresponding effective refractive index changes in the negative index material encoding the data in the amplitude and/or phase of the carrier wave to produce an electromagnetic signal.

14 Claims, 19 Drawing Sheets

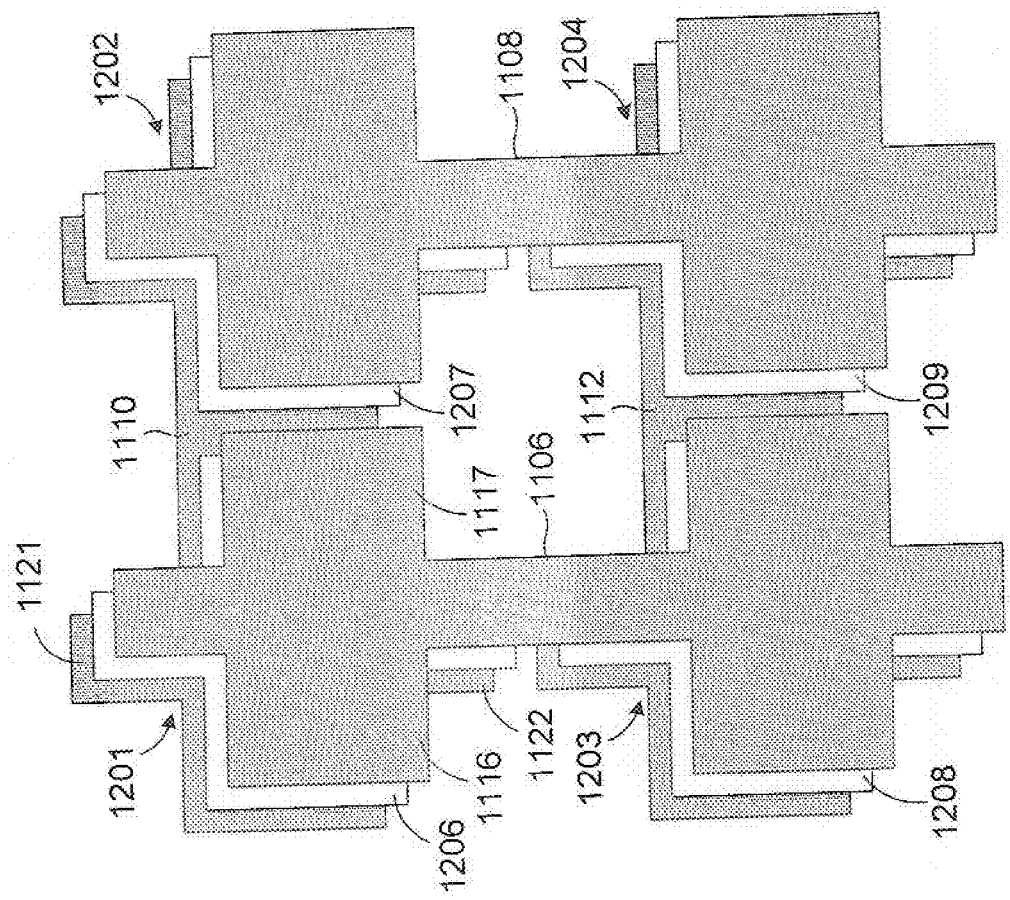
Figure 12
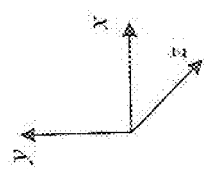

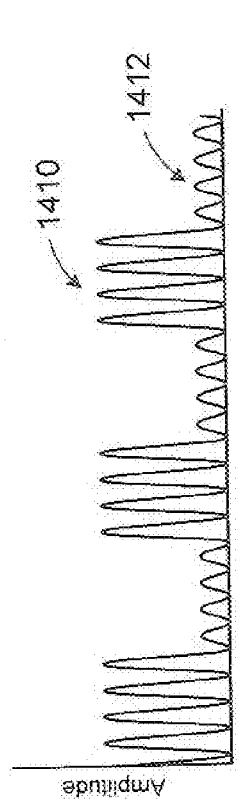
Figure 14C
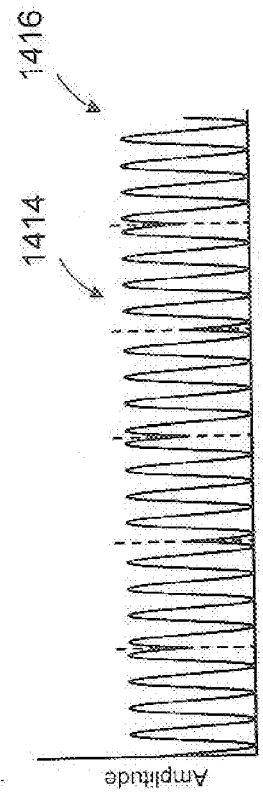
Figure 14D
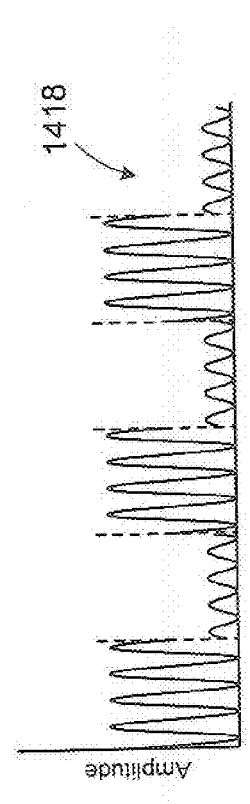
Figure 14E
Figure 14A
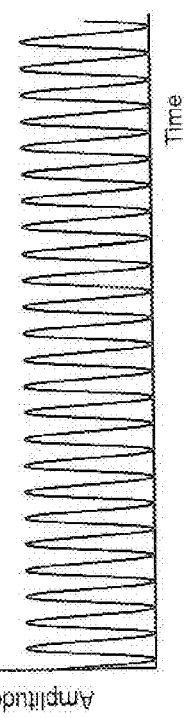
Figure 14B

NEGATIVE INDEX MATERIAL-BASED MODULATORS AND METHODS FOR FABRICATING THE SAME

TECHNICAL FIELD

Embodiments of the present invention relate to external modulators, and, in particular, to optical modulators composed of negative index materials and to methods for fabricating the same.

BACKGROUND

An electromagnetic signal encodes information in high and low amplitude states or phase changes of a carrier wave of electromagnetic radiation. The electromagnetic signal can be transmitted over a waveguide, such as an optical fiber, or over free space. One way in which to generate an electromagnetic signal is to directly modulate the drive current of a laser or light-emitting diode ("LED"). This process of generating electromagnetic signals is called "direct modulation." Unfortunately, direct modulation of radiation emitting devices has a number of drawbacks. First, the modulation rate averaged over power is limited, and second, high speed generated high and low amplitude states of the electromagnetic signal may be indistinguishable. In addition, direct modulation can distort analog signals and shift the output wavelength of an electromagnetic signal, an effect called "chirp," which adds to chromatic dispersion.

The importance of these limitations depends on the system design and the distance over which the electromagnetic signals are transmitted. For example, when an electromagnetic signal is transmitted over many kilometers, these problems can occur with direct modulation data rates as low as 1 Gbit/s. On the other hand, when an electromagnetic signal is transmitted less than a kilometer or two, direct modulation may be sufficient at data rates as high as 10 Gbit/s.

In either case, when direct modulation fails to meet performance requirements, external modulators (i.e., modulators) can be used. A modulator can be operated to encode information in an electromagnetic signal by passing an unmodulated carrier wave of electromagnetic radiation through the modulator with the modulator operated to change the amplitude or phase of the carrier wave. Modulators can be operated at faster modulation rates than direct modulation of a laser or an LED, and typically do not alter the wavelength of the electromagnetic radiation. In recent years, the demand for faster and more efficient modulators has increased in order to keep pace with the increasing demand for high speed data transmission between communicating devices.

BRIEF DESCRIPTION OF THE DRAWINGS

FIG. 12 shows an isometric view of an enlargement of four adjacent resonant elements of a negative index material crossbar configured in accordance with embodiments of the present invention.

FIGS. 14A-14E show examples of amplitude, phase, and amplitude/phase modulated electromagnetic signals generated in accordance with embodiments of the present invention.

DETAILED DESCRIPTION

Figure 1A:
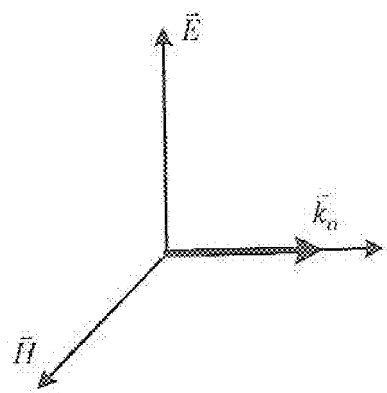
FIGS. 1A-1B show wave and Poynting vector directions for electromagnetic waves propagating in an ordinary right-handed medium.

Various embodiments of the present invention are directed to external, electronically controllable, negative index material-based modulators. The modulators can be composed of a negative index material fishnet structure placed in the path of an unmodulated carrier wave of electromagnetic radiation. Electronic signals applied to the modulator shift the modulator effective refractive index resulting in corresponding amplitude and/or phase changes in the carrier wave. The resulting electromagnetic signal encodes the same information as the electronic signal. In other embodiments, a modulator can be composed of a negative index material crossbar placed in the path of two or more unmodulated carrier waves of electromagnetic radiation. The crossbar configuration enables each of the carrier waves to be separately modulated in different regions of the crossbar in substantially the same manner the single carrier wave is modulated by the fishnet structure. Embodiments of the present invention include methods for fabricating the negative index material-based modulators.

The detailed description of the present invention is organized as follows. A general description of negative index materials is provided in a first subsection. A description of negative index materials having fishnet and crossbar configurations is provided in a second subsection. Modulator embodiments are described in a third subsection. Methods for fabricating modulators are described in a fourth subsection.

In the following description, the term "optical" refers to classical and/or quantized electromagnetic radiation having wavelengths in the visible and non-visible portions of the electromagnetic spectrum.

Negative Index Materials

Negative index materials ("NIMs"), also called metamaterials, are materials with optical properties resulting from the structure of the material rather than from the chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$ for certain portions of the electromagnetic spectrum, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, assuming the temporal evolution of the phase of the wave is $\exp(j\omega t)$, $j=\sqrt{-1}$, and $\omega$ is the angular frequency, consider Maxwell's first-order differential equations for an electromagnetic wave propagating in a homogeneous material with a time harmonic field:

$$\nabla \times \vec{E} = -j\omega\mu\vec{H}$$

$$\nabla \times \vec{H} = j\omega\in\vec{E}$$

where $\vec{E}$ is the electric field component, $\vec{H}$ is the magnetic field component. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 1B:
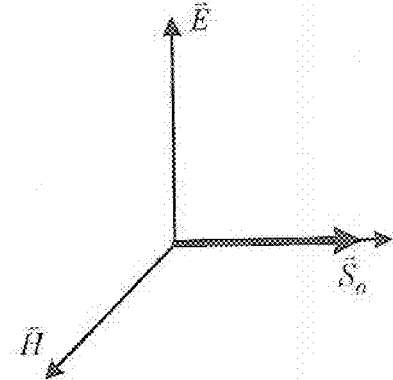
Figure 2A:
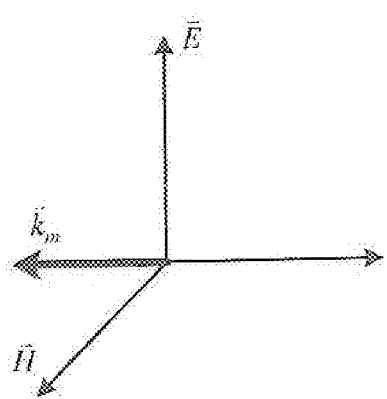
FIGS. 2A-2B show wave and Poynting vector directions for electromagnetic waves propagating in a negative index metamaterial.
Figure 2B:
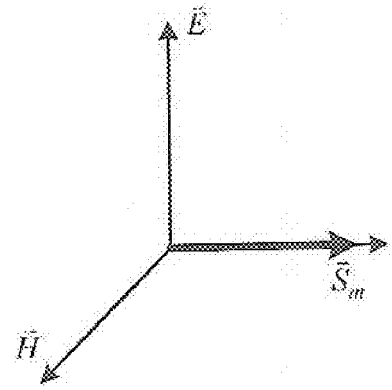

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega\in\vec{E}$$

where $\vec{k}_o$ is a wavevector indicating the direction an electromagnetic wave propagates within a composite material. FIG. 1A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$, form an orthogonal, right-handed system of vectors. In addition, the direction of the time-averaged energy flux of the electromagnetic wave is given by the real component of the Poynting vector:

$$\vec{S}_o = \frac{1}{2}\mathrm{Re}(\vec{E} \times \vec{H}^*)$$

which, as shown in FIG. 1B, reveals that the vectors $\vec{E}$, $\vec{H}$, and $\vec{S}_o$ also form an orthogonal, right-handed vector system. In other words, FIGS. 2A and 2B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

On the other hand, consider NIMs, where $\in<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase the electromagnetic wave propagates in a NIM. As shown in FIG. 2A, and in contrast to the composite materials shown in FIG. 1A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 1A and 2A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 2B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1>0$, from Snell's law it follows that $n_2<0$. That is, the sign of the square root in the definition of the refractive index is chosen to be negative:

$$n_2 = -\sqrt{\in \mu} < 0$$

Hence the term "negative index material" is used to refer to materials having both negative $\in$ and $\mu$.

Figure 3:
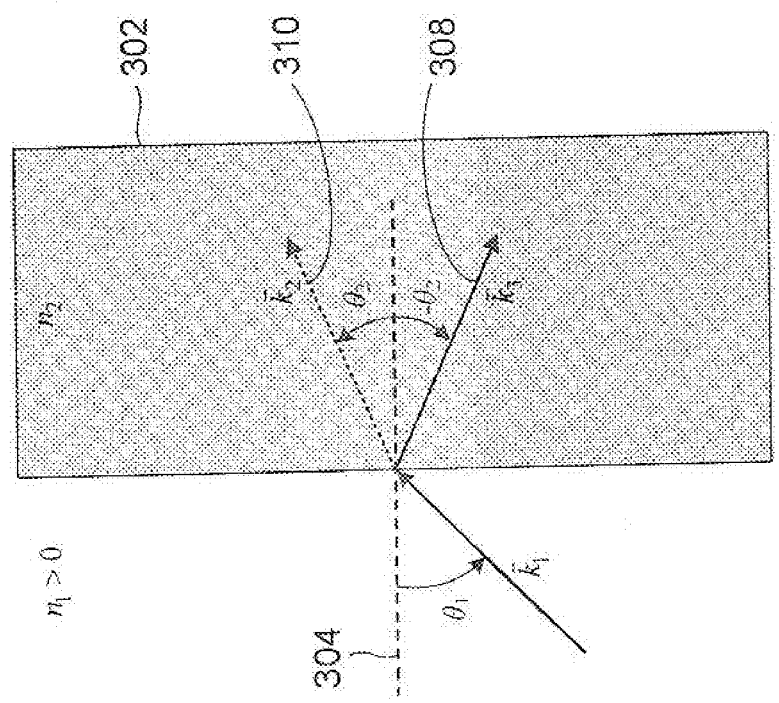
FIG. 3 shows refraction of rays of electromagnetic radiation in an ordinary right-handed medium and a negative index metamaterial.

FIG. 3 shows refraction of rays of electromagnetic radiation in an ordinary right-handed medium and a negative index metamaterial. Dashed line 304 represents a surface normal extending perpendicular to the surface of a medium 302. As shown in FIG. 3, angle $\theta_1$ and wavevector $\vec{k}_1$ 306 represent the angle-of-incidence and direction of a ray of electromagnetic radiation propagating through an ordinary medium with index of refraction $n_1>0$ and is incident on the medium 302. Angle $-\theta_2$ and wavevector $\vec{k}_3$ 308 represent the angle-of-refraction and direction of a refracted ray of electromagnetic radiation propagating within the medium 302 with refractive index $n_2<0$, while angle $\theta_2$ and wavevector $\vec{k}_2$ 310 represent the angle-of-refraction and direction of a refracted ray of electromagnetic radiation propagating within the medium 302 with refractive index $n_2>0$, where $|n_2|>n_1$. Thus, for the medium 302 with a refractive index of $n_2<0$, the incident ray 306 and the refracted ray 308 lie on the same side of the surface normal 304, and for the medium 302 with a refractive index of $n_2>0$, the incident ray 306 and the refracted ray 310 lie on opposite sides of the surface normal 304.

Figure 4:
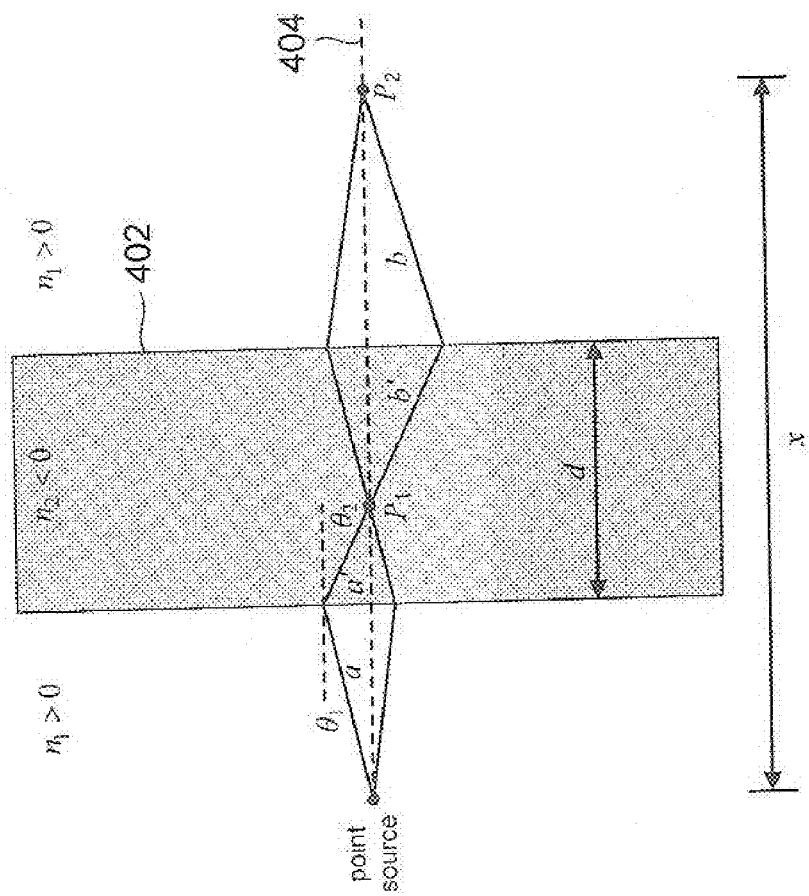
FIG. 4 shows focusing properties of a metamaterial slab for electromagnetic radiation emanating from a point source.

Tracing the paths of optical rays through conventional concave and convex lens made of left-handed media reveals that concave lenses become convergent and convex lens become divergent, thus reversing the behavior of lenses comprising ordinary media. FIG. 4 shows focusing properties of a slab 402 composed of a NIM for electromagnetic radiation emanating from a point source. For incident rays paraxial to an optical axis 404, Snell's law gives:

$$|n| = \frac{|n_2|}{n_1} = \frac{|\sin\theta_1|}{|\sin\theta_2|} \Box \frac{|\tan\theta_1|}{|\tan\theta_2|} = \frac{a'}{a} = \frac{b'}{b}$$

where n is the refractive index $n_2$ of the slab 402 relative to refractive index of the surrounding medium $n_1$. As shown in FIG. 4, rays emanating from the point source are focused at two points $P_1$ and $P_2$. Point $P_1$ lies inside the slab 402 and point $P_2$ lies on the side of the slab 402 opposite the point source. The distance from the point source to the second focusing point $P_2$ is given by:

$$x = a + a' + b' + b = d + \frac{d}{|n|}$$

where d is the width of the slab. When n equals $-1$, the focusing effect is not restricted to paraxial rays, because in this case $|\theta_1|$ equals $|\theta_2|$ for any angle-of-incidence. In fact, when n equals $-1$, all rays emanating from the point source are focused at two points, the latter point $P_2$ being at a distance 2d from the point source. Thus, unlike slabs comprising ordinary composite materials, NIM slabs can be configured to focus electromagnetic radiation.

Negative Index Materials

A. Fishnet Structure

Figure 5:
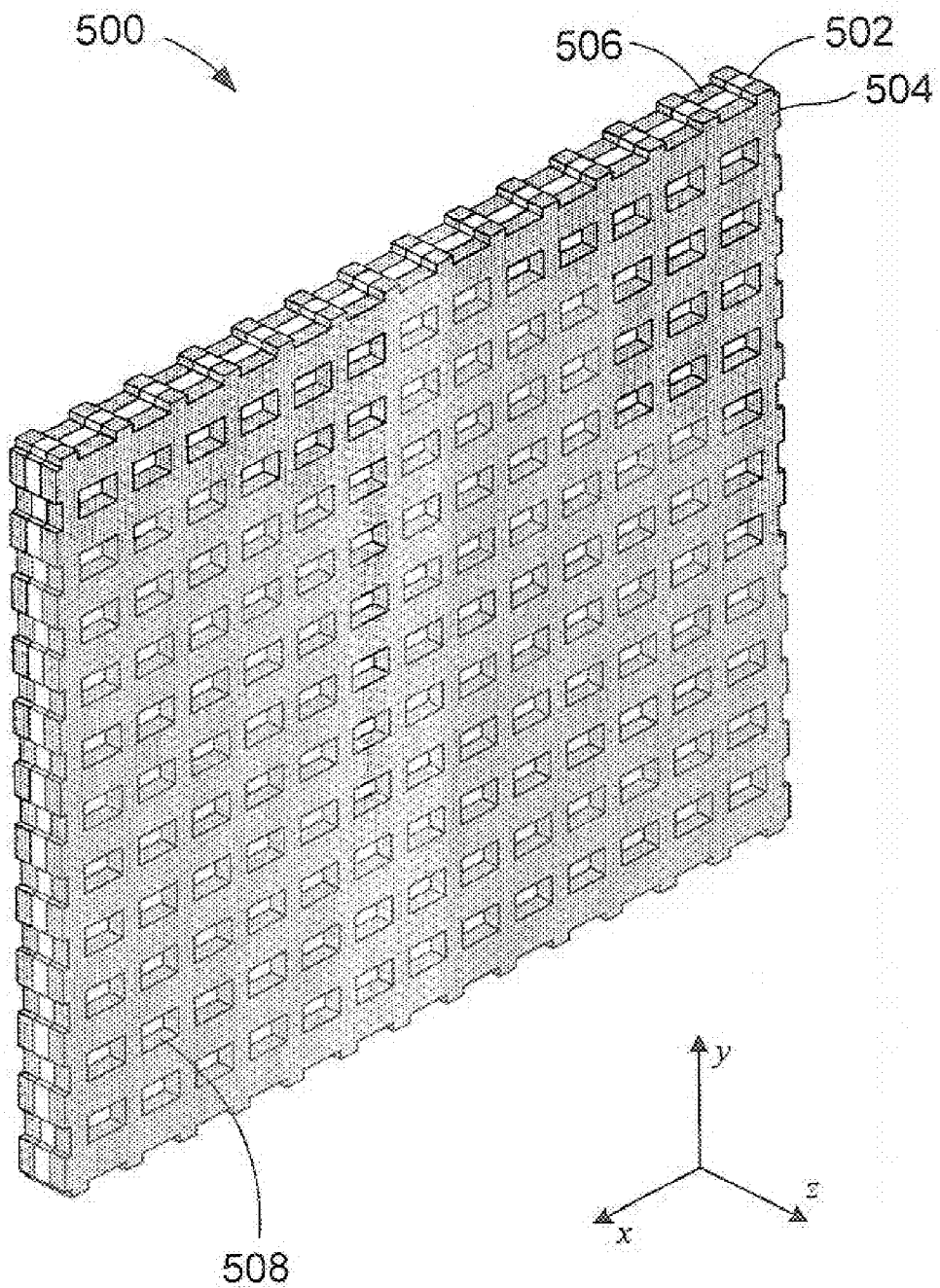
FIG. 5 shows an isometric view of a negative index material fishnet structure configured in accordance with embodiments of the present invention.

FIG. 5 shows an isometric view of a NIM 500 configured in accordance with embodiments of the present invention. The NIM 500 is a three layer structure comprising an intermediate layer 502 sandwiched between two conducting layers 504 and 506. The NIM 500 includes an array of approximately regularly spaced holes, such as hole 508. The array of holes produces a mesh or fishnet appearance. Thus, the NIM 500 is also referred to below as a "fishnet" or a "NIM fishnet."

Figure 6:
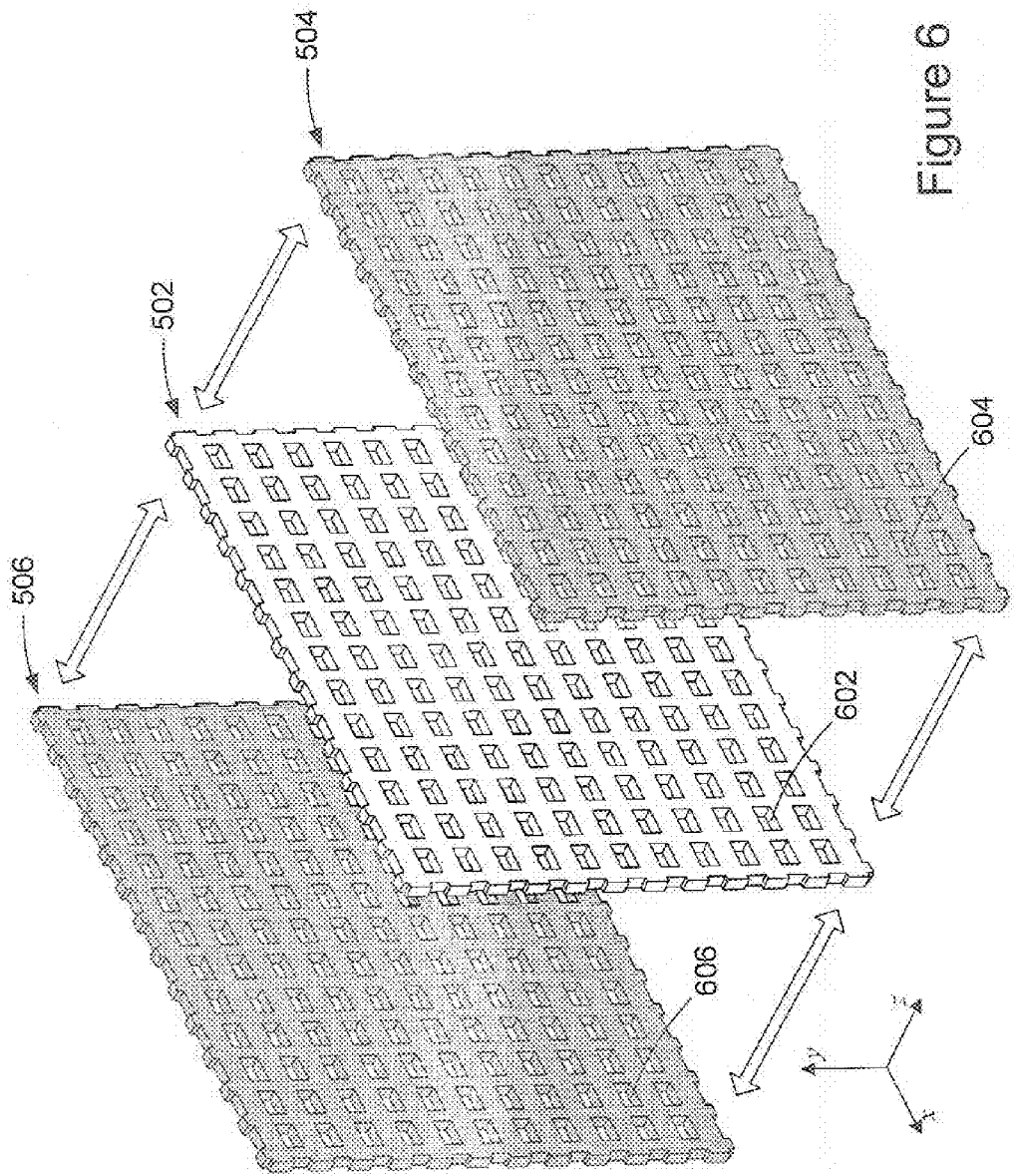
FIG. 6 shows an exploded isometric view of the negative index material fishnet configured in accordance with embodiments of the present invention.

FIG. 6 shows an exploded isometric view of the NIM fishnet 500 configured in accordance with embodiments of the present invention. FIG. 6 reveals an array of approximately regularly spaced rectangular-shaped holes extending through all three of the layers 502, 504, and 506, with the holes in each layer aligned with the holes in the other two layers. For example, holes 602, 604, and 606 in layers 502, 504, and 506, respectively, are aligned, forming the hole 508 extending through NIM fishnet 500. In certain embodiments, as shown in FIGS. 5 and 6, the holes can be rectangular, and in other embodiments, the holes can be square, elliptical, circular, irregularly shaped, or any other suitable shape.

Figure 7:
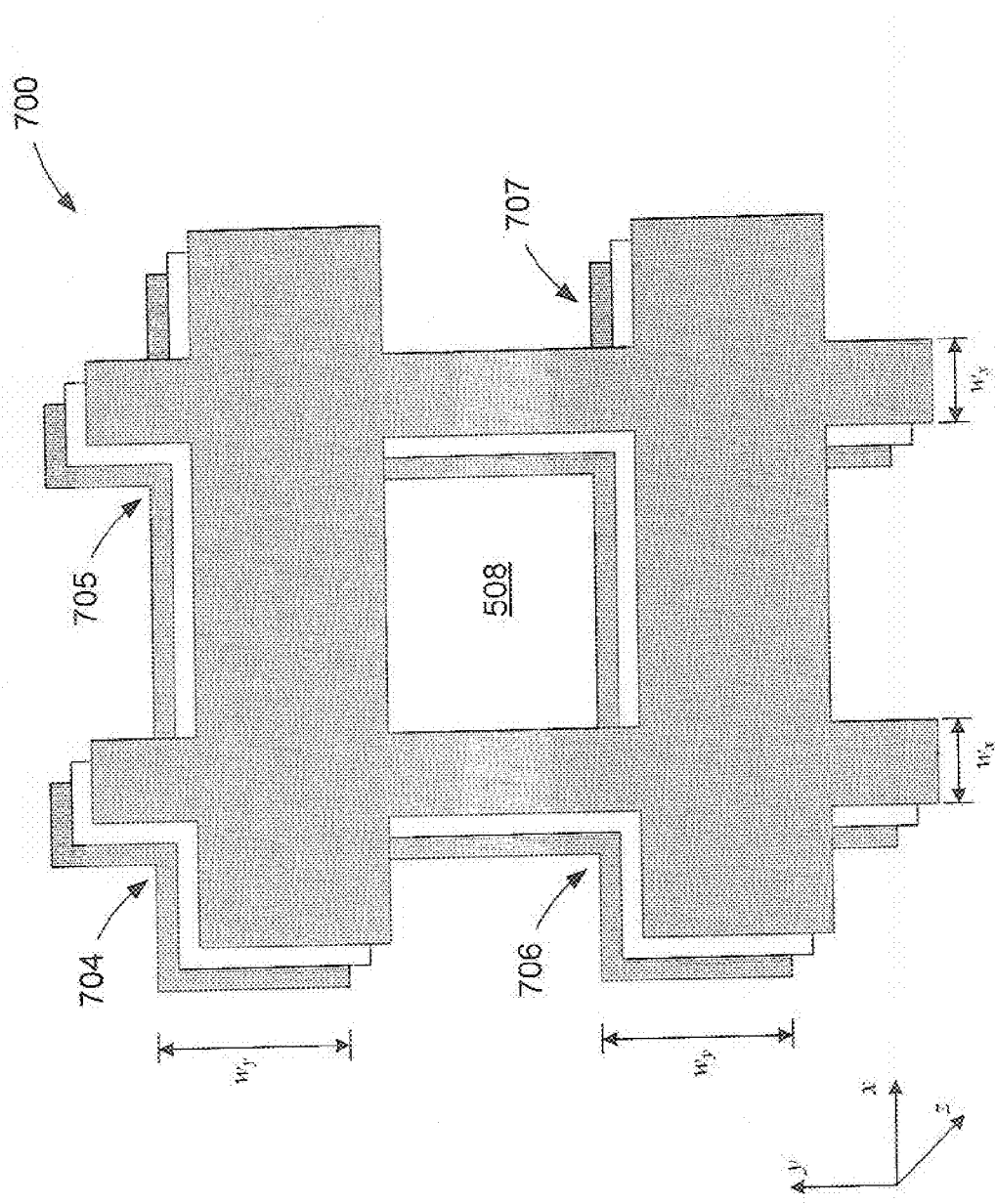
FIG. 7 shows an isometric view and enlargement of four adjacent resonant structures of a negative index material fishnet configured in accordance with embodiments of the present invention.

FIGS. 5 and 6 also reveal that the holes extending in the x-direction are separated by portions of the NIM fishnet 500 that are relatively thinner than portions of the NIM fishnet 500 separating holes extending in the y-direction. FIG. 7 shows an isometric view and enlargement 700 of the NIM fishnet 500 region around the hole 508 in accordance with embodiments of the present invention. As shown in FIG. 7, the width $w_x$ of material separating holes extending in the x-direction is less than the width $w_y$ of material separating holes in extending in the y-direction. The intersections of thin and relatively thicker portions of the NIM fishnet 500 form resonant structures, such as the four adjacent resonant structures 704-707.

The resonant structures can be configured with dimensions that are smaller than the wavelength $\lambda$ of electromagnetic radiation incident on the NIM fishnet 500 enabling the NIM fishnet 500 to be operated as a NIM over particular wavelength ranges of interest. In particular, the size and shape of the resonant structures can be selected to have an appropriate inductance, resistance, and capacitance response to a wavelength of interest. In addition, the refractive index of the intermediate layer can be adjusted by applying appropriate electronic signals, such as voltages or currents, to the layers 504 and 506. The size and shape of the resonant structures and control over the refractive index of the intermediate layer 502 enables the NIM fishnet 500 to be configured and operated as a NIM over particular wavelength ranges of interest and thereby shift the transmission phase of electromagnetic radiation transmitted through the NIM fishnet 500.

Figure 8:
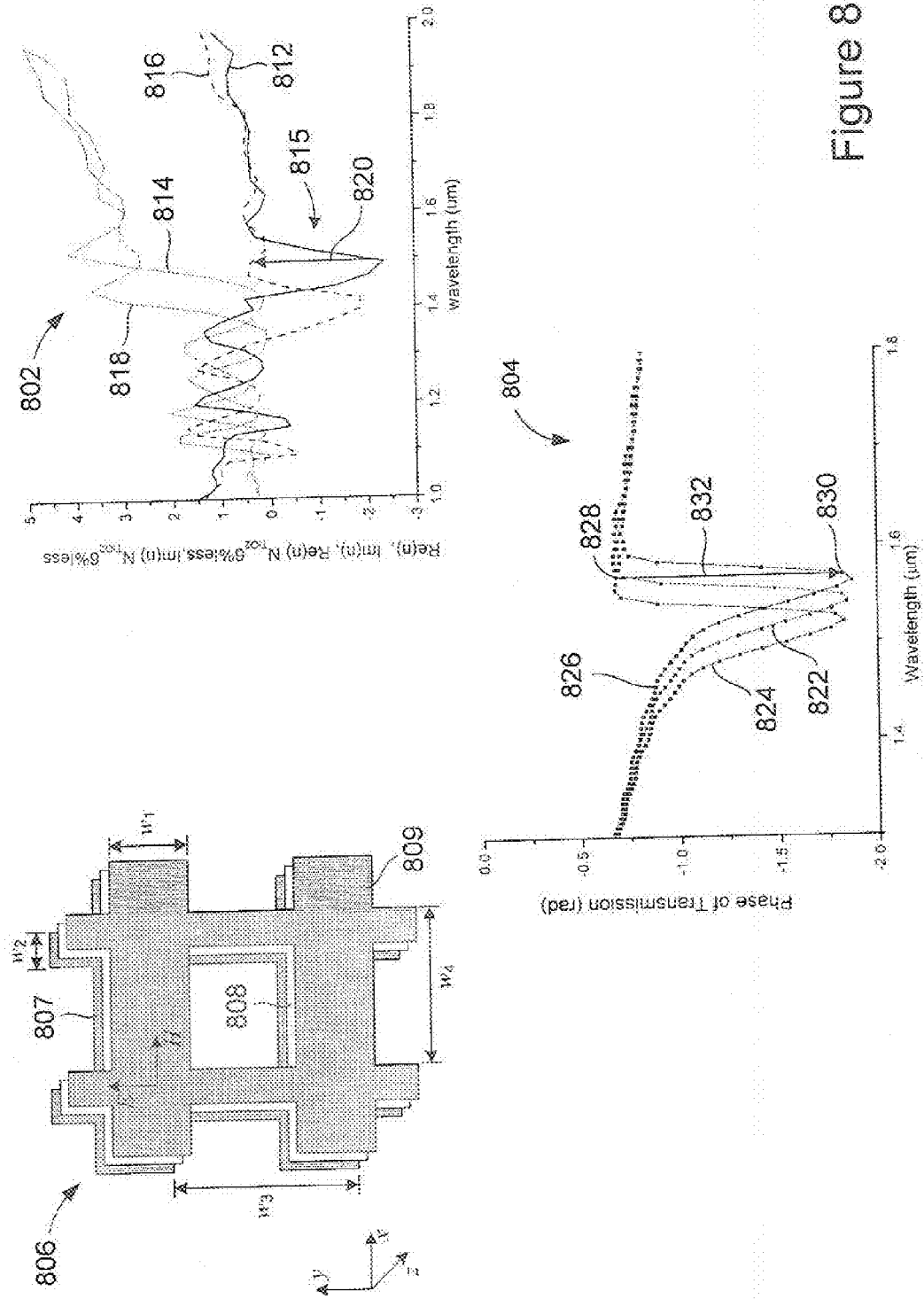
FIG. 8 shows a plot of the refractive index and phase changes for an exemplary negative index material fishnet configured and operated in accordance with embodiments of the present invention.

FIG. 8 shows a plot of the refractive index 802 and phase changes 804 for an exemplary four resonant structure NIM fishnet 806 configured and operated in accordance with embodiments of the present invention. Plots 802 and 804 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 8 also includes parameters identifying the dimensions of the NIM fishnet 806 used to obtain the results displayed in plots 802 and 804. The dimensions of the parameters are provided in Table I as follows:

TABLE I

| Parameter | Dimension |
|---|---|
| $w_1$ | 225 nm |
| $w_2$ | 90 nm |
| $w_3$ | 450 nm |
| $w_4$ | 450 nm |

The conductive layer 807 and 809 are composed of Ag, and the intermediate layer 808 is composed of $TiO_2$ with a thickness of 60 nm.

For electromagnetic radiation polarized in the y-direction and incident on the NIM fishnet 806 in the z-direction, curves 812 and 814 of plot 802 represent the real and imaginary refractive index components, respectively, over a range of wavelengths with no electronic signal applied to conductive layers 807 and 809 of the NIM fishnet 806. A portion 815 of the real component 812 indicates that the NIM fishnet 806 exhibits a negative refractive index for incident electromagnetic radiation with wavelengths ranging from approximately 1.42 μm to approximately 1.55 μm with the largest negative refractive index occurring for incident electromagnetic radiation with wavelengths of approximately 1.5 μm. Curves 816 and 818 of plot 802 represent the real and imaginary refractive index components with a 6% change in the refractive index when appropriate electronic signals are applied to the conductive layer 807 and 809 of the NIM fishnet 806. Curve 816 exhibits a real negative refractive index shift for incident electromagnetic radiation with wavelengths ranging from approximately 1.32 μm to approximately 1.46 μm with the largest negative refractive index occurring for incident electromagnetic radiation with wavelengths of approximately 1.4 μm. In other words, the NIM fishnet 806 can be operated to change the refractive index that incident electromagnetic radiation encounters over particular wavelength ranges. For example, incident electromagnetic radiation with a wavelength of interest, such as a wavelength of approximately 1.5 μm, encounters the strongest real negative refractive index component when no electronic signal is applied to the conductive layers 807 and 809 of the NIM fishnet 806. However, when appropriate electronic signals are applied to the conductive layers 807 and 809, the refractive index encountered by the wavelength of interest is shifted to a positive relatively smaller in magnitude refractive index, as indicated by directional arrow 820.

A change in the refractive index encountered by the wavelength of interest shifts the transmission phase of the wavelength of interest. Curves 822-824 of plot 804 represent the transmission phase of electromagnetic radiation over a range of wavelengths passing through the NIM fishnet 806 for three different refractive indices. Curve 822 represents the transmission phase acquired by electromagnetic radiation over a range of wavelengths passing through the NIM fishnet 806 when no electronic signal is applied to the NIM fishnet 806. Curve 824 represents the transmission phase acquired by electromagnetic radiation over a range of wavelengths passing through the NIM fishnet 806 when electronic signals applied to the conductive layers 807 and 809 of the NIM fishnet 806 increase the refractive index of the intermediate layer 808 by 3%. Curve 826 represents the transmission phase acquired by electromagnetic radiation over a range of wavelengths passing through the NIM fishnet 806 when electronic signals applied to the conductive layers 807 and 809 of the NIM fishnet 806 decrease the refractive index of the intermediate layer 808 by 3%. The NIM fishnet 806 can be operated to shift the phase acquired by a wavelength of interest. The transmission phase is the phase acquired by electromagnetic radiation transmitted through the NIM fishnet 806. For example, when no electronic signal is applied to the NIM fishnet 806, point 828 indicates that electromagnetic radiation with the wavelength interest, approximately 1.58 μm, transmitted through the NIM fishnet 806 acquires a transmission phase of approximately −0.7 radians. On the other hand, when electronic signals corresponding to the curve 826 are applied to the NIM fishnet 806, the wavelength of interest acquires a transmission phase of approximately −1.78 radians, which is a transmission phase shift of approximately −1.2 radians from the point 828 to the point 830, as indicated by directional arrow 832.

B. Crossbars

Figure 9:
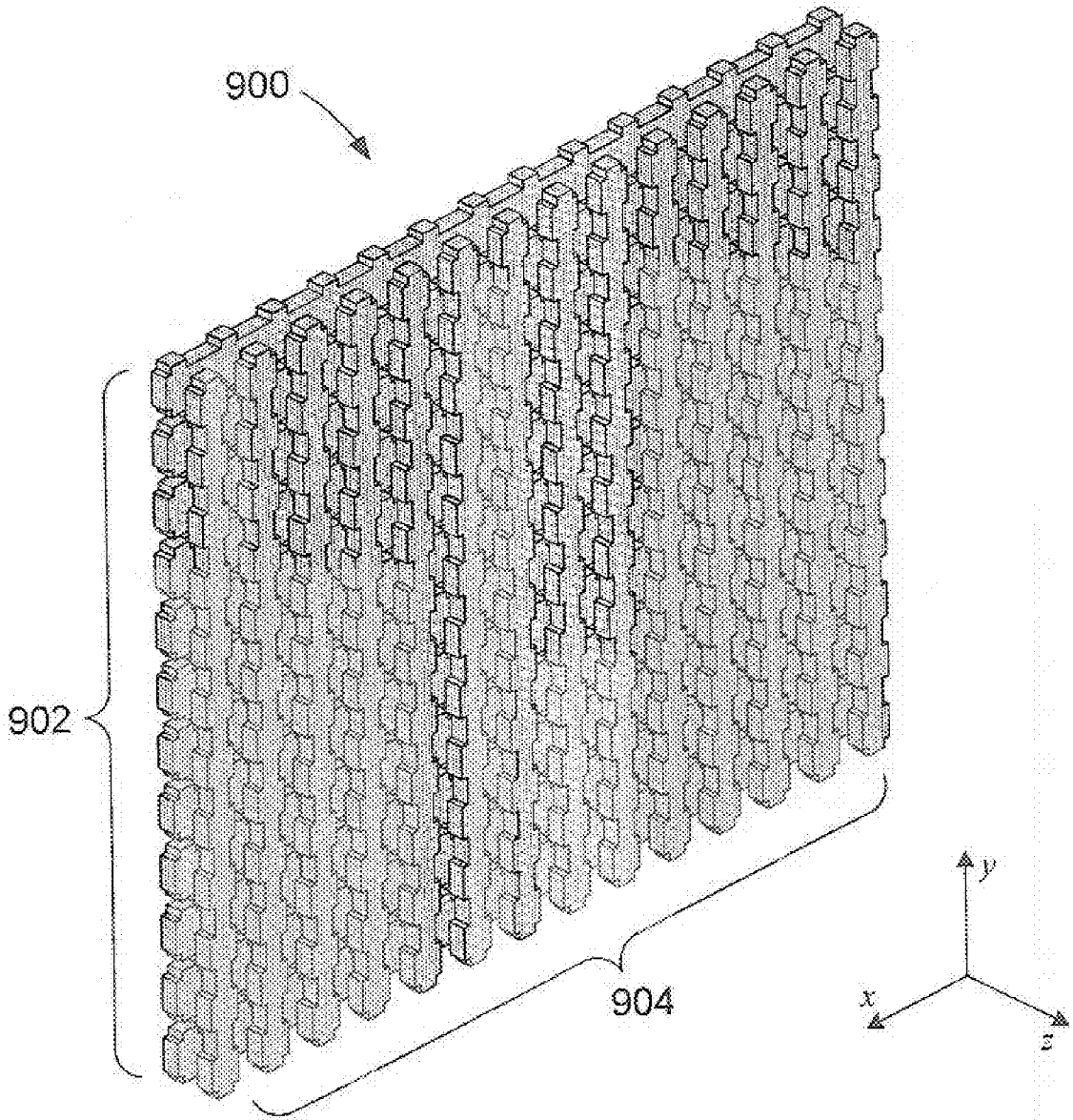
FIG. 9 shows an isometric view of a negative index material crossbar configured in accordance with embodiments of the present invention.

FIG. 9 shows an isometric view of a NIM crossbar 900 configured in accordance with embodiments of the present invention. The NIM crossbar 900 comprises a first layer of non-crossing, approximately parallel nanowires 902 that are overlain by a second layer of non-crossing, approximately parallel nanowires 904. The nanowires of the first layer 902 run substantially parallel to the x-axis and are approximately perpendicular, in orientation, to the nanowires of the second layer 904, which run substantially parallel to the y-axis, although the orientation angle between the nanowires of the layers 902 and 904 may vary. The two layers of nanowires form a lattice, or crossbar, with each nanowire of the second layer 904 overlying all of the nanowires of the first layer 902 and coming into close contact with each nanowire of the first layer 902 at nanowire intersections called "resonant elements" that represent the closest contact between two overlapping nanowires.

Figure 10:
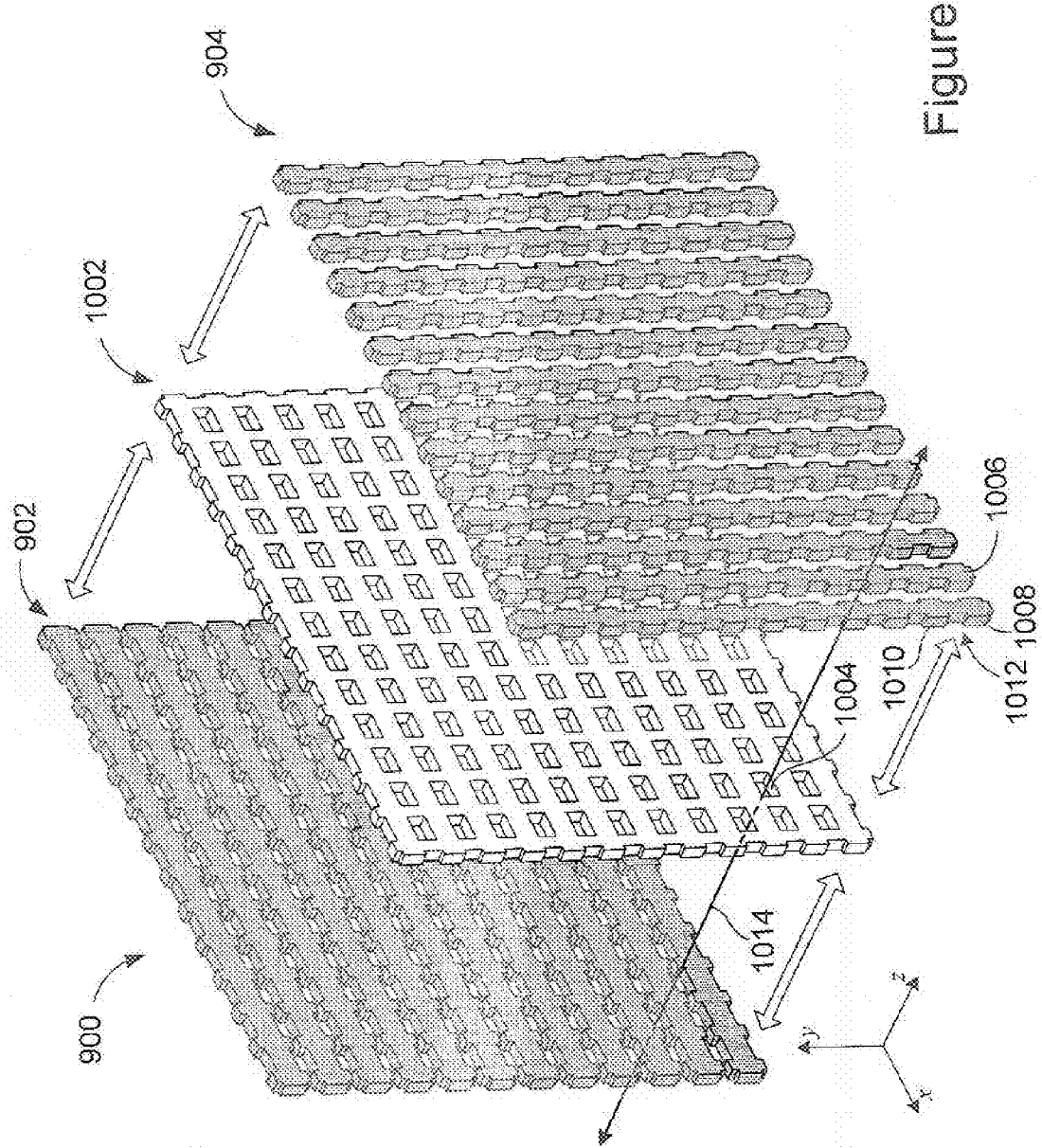
FIG. 10 shows an exploded isometric view of the negative index material crossbar configured in accordance with embodiments of the present invention.

FIG. 10 shows an exploded isometric view of the NIM crossbar 900 configured in accordance with embodiments of the present invention. FIG. 10 reveals an intermediate layer 1002 sandwiched between the first layer of nanowires 902 and the second layer of nanowires 904. The intermediate layer 1002 is a continuous layer including an array of regularly spaced holes, such as hole 1004. In certain embodiments, as shown in FIG. 10, the holes can be rectangular, and in other embodiments, the holes can be square. The nanowires in the first layer 902 have relatively larger cross-sectional dimensions than the nanowires comprising the second layer 904. FIG. 10 also reveals that the nanowires in both the first and second layers 902 and 904 are configured with substantially regularly spaced protuberances called "fingers" that are separated by notches. For example, nanowire 1006 includes fingers 1008 and 1010 separated by a notch 1012. The fingers of nanowires of one layer are approximately parallel to the length of the nanowires in the other layer, and the fingers of adjacent nanowires within the same layer are also substantially aligned within the first and second layers 902 and 904, and the holes in the intermediate layer 1002 are substantially aligned with the notches between fingers in the first and second layers 902 and 904. For example, line 1014 passes through notches of adjacent nanowires in the first layer 902 passes through the hole 1004 in the intermediate layer 1002 and passes through notches in adjacent nanowires in the second layer 904.

Figure 11:
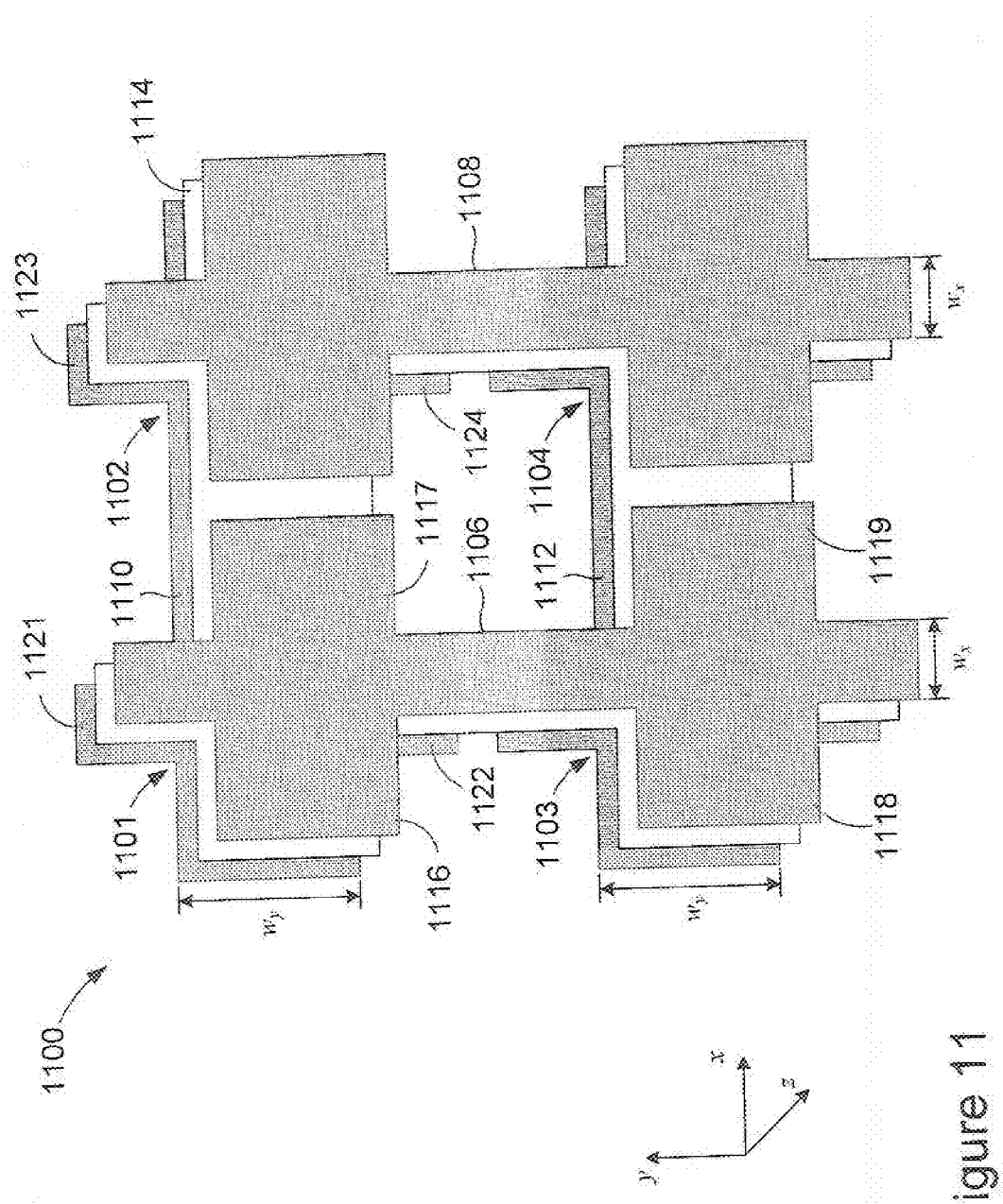
FIG. 11 shows an isometric view of an enlargement of a four adjacent resonant elements of the negative index material crossbar configured in accordance with embodiments of the present invention.

FIG. 11 shows an isometric view of an enlargement 1100 of a four adjacent resonant elements 1101-1104 of the NIM crossbar 900 configured in accordance with embodiments of the present invention. The resonant elements 1101-1104 are formed by nanowires 1106 and 1108 extending in the y-direction overlaying portions of nanowires 1110 and 1112 extending in the x-direction. The nanowires 1106 and 1108 are separated from the nanowires 1110 and 1112 by a portion 1114 of intermediate layer 1002. The width $w_y$ of the nanowires 1110 and 1112 in the first layer 902 is larger than the width $w_x$ of the nanowires 1106 and 1108 in the second layer 904. The nanowires 1106 and 1108 include fingers protruding in the x-direction, such as fingers 1116-1119 of nanowire 1106, and nanowires 1110 and 1112 include fingers protruding in the y-direction, such as fingers 1121-1124 of nanowire 1110. The fingers of adjacent nanowires lying in the same layer are separated by gaps. As shown in FIG. 11, each of the resonant elements 1101-1104 includes two fingers of a nanowire in the first layer 902 and two fingers of a nanowire in the second layer 904. For example, resonant element 1101 includes fingers 1116 and 1117 of nanowire 1106 and fingers 1121 and 1122 of nanowire 1110.

In other embodiments, the intermediate layer 1002 may be composed of discrete plus-shaped portions of a material lying within each resonant element. FIG. 12 shows an isometric view of an enlargement 1200 of four adjacent resonant elements 1201-1204 of a NIM crossbar configured in accordance with embodiments of the present invention. The resonant elements 1201-1204 include intermediate plus-shaped layers 1206-1209, respectively, disposed within the region between the fingers of nanowires 1106 and 1108 overlaying nanowires 1110 and 1112. As shown in FIG. 12, adjacent plus-shaped layers 1206-1209 are separated by gaps, and each plus-shaped layer fills the space between the nanowire of one layer and the fingers of a nanowire in another layer. For example, plus-shaped layer 1206 is configured to fill the space between fingers 1121 and 1122 and nanowire 1106 and fill the space between fingers 1116 and 1117 and nanowire 1110.

Although individual nanowires shown in FIG. 9-8 have rectangular cross sections, nanowires can also have square, circular, elliptical, or more complex cross sections dictated by design of supporting a magneto-plasmon resonance and related NIM behavior over a particular wavelength or frequency range of interest of the electromagnetic spectrum. The nanowires may be configured to have many different widths or diameters and aspect ratios or eccentricities ranging from approximately 1/5 to approximately 1/20 of the wavelength of incident electromagnetic radiation or ranging from approximately 20 nm to approximately 200 nm. Although the fingers shown in FIGS. 5-8 have clearly defined edges, in other embodiments, the fingers may have rounded edges. The term "resonant element" may refer to crossbars having one or more layers of sub-microscale wires, microscale wires, or wires with larger cross-sectional dimensions, in addition to nanowires.

The resonant elements can be configured with dimensions that are smaller than the wavelength λ of electromagnetic radiation incident on the crossbar 900 enabling the crossbar 900 to be operated as a NIM over particular wavelength ranges of interest. In particular, the size and shape of the fingers can be selected to have an appropriate inductance, resistance, and capacitance response to a wavelength of interest. In addition, because each resonant element can be separately addressed by biasing the pair of nanowires crossing at the selected resonant element, the refractive index of the intermediate layer of each resonant element can be adjusted by applying appropriate electronic signals, such as voltages or currents, to the nanowires. The size and shape of the fingers and control over the refractive index of the intermediate layer of the resonant elements enables the crossbar 900 to be configured and operated as a NIM over particular wavelength ranges of interest and shift the transmission phase of electromagnetic radiation transmitted through the crossbar 900.

NIM crossbar 900 can be operated in the same as the NIM fishnet 500 to obtain change in the effective refractive index that are analogous to the results described above with reference to FIG. 8.

C. Fishnet Structure and Crossbar Composition

The conducting layers 504 and 506 and nanowires 904 and 906 can be composed of silver ("Ag"), gold ("Au"), copper ("Cu"), aluminum ("Al"), platinum ("Pt"), or another suitable electronically conducting metal, or the layers and nanowires can be composed of heavily doped semiconductors depending on the wavelength of incident electromagnetic radiation.

The intermediate layers 502 and 1002 can be composed of an electro-optical material with refractive index properties that can vary according to the particular molecular configuration or electronic states of the material and exhibit an appreciable refractive index change in response to externally applied electric fields. For example, the intermediate layers 502 and 1002 can be composed of lithium niobate ($LiNbO_3$). In certain embodiments, the electro-optical material may transition reversibly from one state to another and back. The molecules comprising the intermediate layers 502 and 1002 may have various different states in which the molecules exhibit resistive, semiconductor-like, or conductive electrical properties. The states and relative energies of the states of the intermediate layers 502 and 1002 may be controlled by applying differential current levels or voltages to the overlapping nanowires. For example, in certain embodiments, certain states of the intermediate layers 502 and 1002 materials can be set by applying electronic signals to the conducting layers 504 and 506 and nanowires 904 and 906. In certain embodiments, the applied electronic signals can change the oxidation or redox state of the electro-optical material which induces a change in the refractive index of the nanowire intersection.

In certain embodiments, the intermediate layers 502 and 1002 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The intermediate layers 502 and 1002 can include impurities also called dopants. The dopants can be p-type impurities, which are atoms that introduce vacant electronic energy levels called "holes" to the electronic band gaps of the electro-optical material. These impurities are also called "electron acceptors." The dopants can be n-type impurities, which are atoms that introduce filled electronic energy levels to the electronic band gap of the p-n junction 702. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the intermediate layers 502 and 1002 can be adjusted by varying the magnitude and type of bias applied the intermediate layers 502 and 1002. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the intermediate layers 502 and 1002 return to an unbiased electronic state. The refractive index of the intermediate layers 502 and 1002 is different under the forward, reverse, and no bias.

In other embodiments, intermediate layers 502 and 1002 can be composed of material that enable the intermediate layers 502 and 1002 to operate as a memristor layer that can change and retain its resistance state even after the bias has been removed. Each resistance state corresponds to a different refractive index. In these embodiments, intermediate layers 502 and 1002 include a primary active region, or layer, and a secondary active region, or layer. The primary active region comprises a thin film of a material that is electronically semiconducting or nominally electronically insulating and can also be a weakly ionic conductor. The primary active material is capable of transporting and hosting ions that act as dopants to control the flow of electrons through the intermediate layers 502 and 1002. The basic mode of operation can be to apply a voltage bias of an appropriate magnitude and polarity across the intermediate layers 502 and 1002 at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The intermediate layers 502 and 1002 can be placed in one of the four different types of rectifying states: a forward rectifier, a reverse rectifier, a head-to-head rectifier, and a shunted rectifier. Each of the rectifying states corresponds to a different refractive index.

In addition, the primary active material and the dopants are chosen such that the drift of the dopants into or out of the primary active material is possible but not too facile in order to ensure that the intermediate layers 502 and 1002 remain in a particular rectifying state for a reasonable period of time, perhaps for many years at room temperature. This ensures that the intermediate layers 502 and 1002 are nonvolatile. In other words, the memristor material holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the nanowire intersection to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions of the intermediate layers 502 and 1002 are contacted on either side by nanowires or one of the nanowires can be composed of a semiconductor material and the other a metal. When the intermediate layers 502 and 1002 are composed of semiconductor materials, the contract between a metal electrode and the memristor material depletes the memristor material of free charge carriers. Thus, the memristor material has a net charge that depends on the identity of the dopant which is positive in the case of electron donors and negative in the case of electron acceptors.

Switching from one rectifying state to another can be accomplished by applying an electric field of an appropriate magnitude and polarity across the intermediate layers 502 and 1002. The electric field forces the dopants to drift into or out of the electrode/active region interface regions thus changing the rectifying state of the memristor material. An appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material may be substantially improved if one of the interfaces connecting the memristor material to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the nanowire intersection.

The primary and secondary active materials of the intermediate layers 502 and 1002 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the intermediate layers 502 and 1002 can be composed of mixed compounds, in which there are two or more metal atoms combined with some number of electronegative elements. The dopants can be anion vacancies or different valence elements doped in the intermediate layers 502 and 1002. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The intermediate layers 502 and 1002 can be composed of oxides that contain at least one oxygen atom (O) and at least one other element. In particular, the intermediate layers 502 and 1002 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the intermediate layers 502 and 1002 include alloys of these oxides in pairs or with all three of the elements Ti, Zr, and Hf present. For example, the intermediate layers 502 and 1002 can be composed of $Ti_xZr_yHf_zO_2$, where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the intermediate layers 502 and 1002 can be composed of $ABO_3$, where A represents a divalent element (e.g., $Sr^{++}$, $Ba^{++}$) and B represents $Ti^{4+}$, $Zr^{4+}$, and $Hf^{4+}$. The intermediate layers 502 and 1002 can also be composed of alloys of these various compounds, such as $Ca_aSr_bBa_cTi_xZr_yHf_zO_3$, where $a+b+c=1$ and $x+y+z=1$. There are also a wide variety of other oxides of the transition and rare earth metals with different valences that may be used, both individually and as more complex compounds. In each case, the mobile dopant can be an oxygen vacancy or an aliovalent element doped into the intermediate layers 502 and 1002. The oxygen vacancies effectively act as dopants with one shallow and one deep energy level. Because even a relatively minor nonstoichiometry of about 0.1% oxygen vacancies in $TiO_{2-x}$ is approximately equivalent to $10^{20}$ dopants/$cm^3$, modulating oxygen vacancy profiles have strong effect on electron transport.

In other embodiments, the intermediate layers 502 and 1002 can be a sulfide or a selenide of the transition metals with some ionic bonding character, essentially the sulfide and selenide analogues of the oxides described above.

In other embodiments, the intermediate layers 502 and 1002 can be a semiconducting nitride or a semiconducting halide. For example, semiconducting nitrides include AlN, GaN, ScN, YN, LaN, rare earth nitrides, and alloys of these compounds and more complex mixed metal nitrides, and semiconducting halides include CuCl, CuBr, and AgCl. The intermediate layers 502 and 1002 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and CuO, exhibit large changes in refractive indices.

Optical Modulators

Figure 13A:
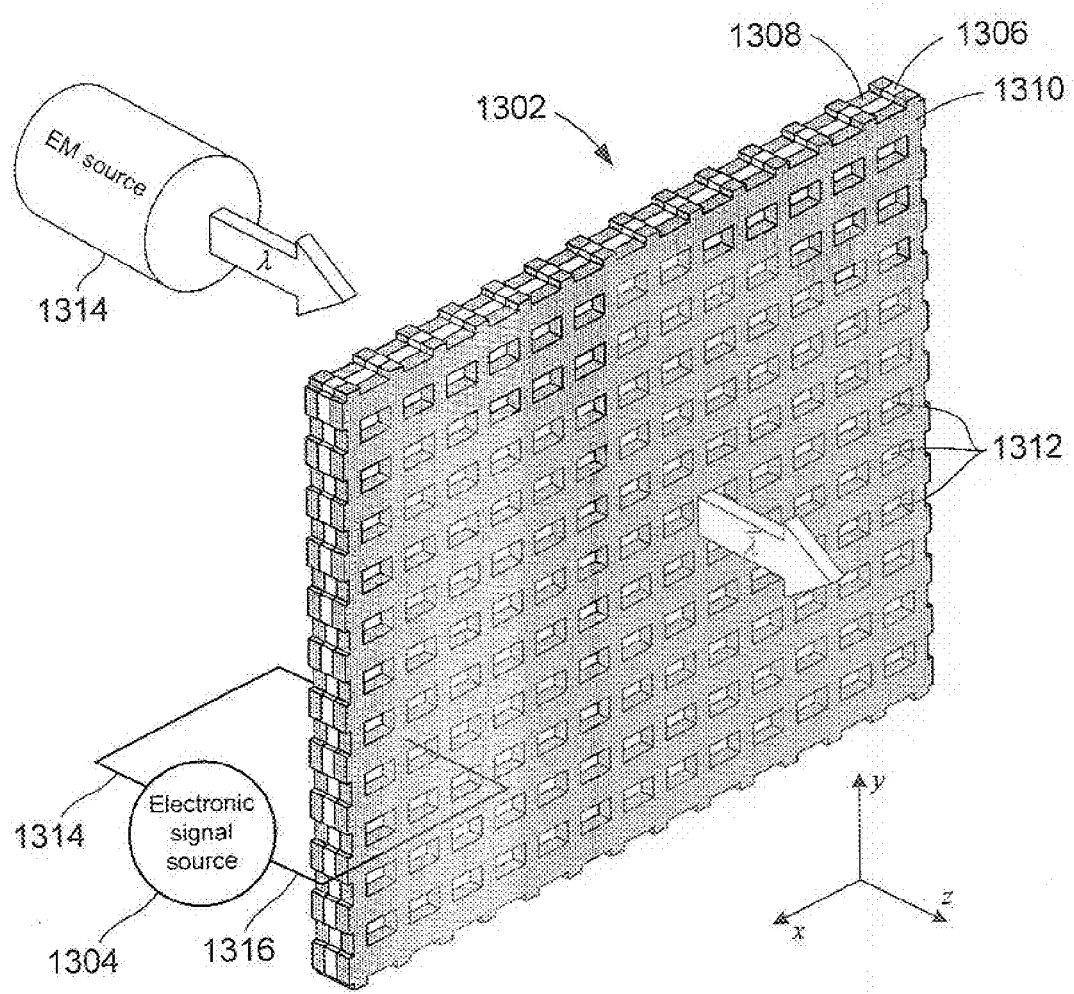
FIGS. 13A-13B show isometric and side views of an electronically controlled, negative index material modulator configured in accordance with embodiments of the present invention.
Figure 13B:
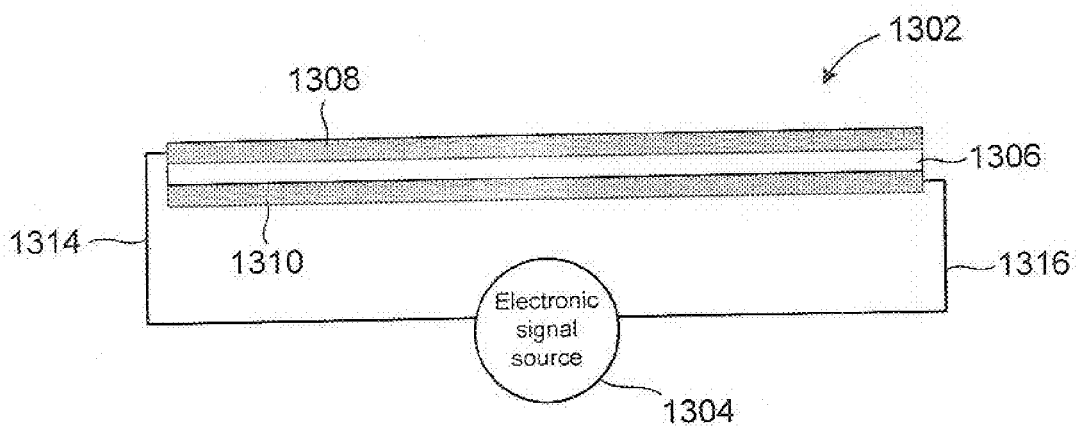

FIGS. 13A-13B show an isometric view and a side view, respectively, of an electronically controlled, negative index material modulator 1300 configured in accordance with embodiments of the present invention. The modulator 1300 comprises a NIM fishnet 1302 and an electronic signal source 1304. The NIM fishnet 1302 includes a intermediate layer 1306 sandwiched between two conducting layers 1308 and 1310 and an array of approximately regularly spaced rectangular-shaped holes 1312, as described above with reference to FIGS. 5 and 6. In other embodiments, the holes can be square, elliptical, circular, irregularly shaped, or any other suitable shape for forming resonance structures, as described above in the Negative Index Material Fishnet subsection. As shown in FIG. 13, the electronic signal source 1304 is in electronic communication with conductive layers 1308 and 1310 via separate electrical contracts 1314 and 1316. The electronic signal source 1304 can be a driver in electronic communication with a processor, a memory controller, an electronic input port or any other electronic device that generates, stores, or transmits data in electronic signals.

FIG. 13A also shows an electromagnetic radiation source 1314 that emits an unmodulated carrier wave $\lambda$ of electromagnetic radiation in the z-direction. The carrier wave can lie within the wavelength range of interest for which the NIM fishnet 1300 has a negative effective refractive index. The source 1314 can be laser or an LED. As the carrier wave $\lambda$ is transmitted through the NIM fishnet 1302, the electronic signal source 1304 applies an electronic signal to the conducting layers 1308 and 1310. The electronic signal comprises a series of relatively low and high voltages or currents that correspondingly shift the effective refractive index of the intermediate layer 1306, as described above with reference to FIG. 8. A change in the effective refractive index of the intermediate layer 1306 depends on the chemical composition of the intermediate layer 1306 and on how the intermediate layer 1306 responds to the magnitude and polarity of the electronic signals applied. In particular, an appropriate voltage or current applied to the conducting layers 1308 and 1310 changes the oxidation or redox state, resistivity, variation in ion concentration, distribution of vacancies, or injection of charge carriers of the intermediate layer 1306. For example, the effective refractive index can be negative when a low or no voltage is applied to the NIM fishnet 1300 and switch to a positive smaller valued effective refractive index when a relative higher voltage is applied. Changes in the effective refractive index of the intermediates layer 1306 produces corresponding changes in the amplitude, phase, or both the amplitude and phase of the carrier wave $\lambda$ producing an electromagnetic signal $\overline{\lambda}$ that encodes the same information as the electronic signal.

Note that when the intermediate layer 1306 is composed of non-volatile memristor materials described above, the modulate can retain a particular effective refractive index even without externally applied voltages until a different voltage is applied to change the refractive index of modulator. Thus, the memristive properties can save energy when encoding long strings of "1's" or "0's." In other embodiments, the non-volatility of the memristor material enables the modulator to be used as an optical switch. In still other embodiments, the intermediate layer 1306 can be composed of volatile materials, as described above.

FIGS. 14A-14E show examples of amplitude, phase, and amplitude/phase modulated electromagnetic signals generated in accordance with embodiments of the present invention. FIG. 14A shows an amplitude versus time plot of an unmodulated carrier wave A of electromagnetic radiation output from an electromagnetic radiation source, such as source 1314. The portion of the carrier wave shown in FIG. 14A represents an ideal case where the amplitude and phase of the carrier wave remain substantially unchanged prior to passing through the NIM fishnet 1302.

FIG. 14B shows an electronic signal versus time, the electronic signals generated by an electronic signal source and applied to the NIM fishnet 1302. Data is encoded in variations in magnitude of the electronic signal. For example, in certain embodiments, a high magnitude to a low magnitude transition 1402 in the electronic signal can represent binary number "0," and low magnitude to a high magnitude transition 1404 in the electronic signal can represent binary number "1." In other embodiments, a sustained low magnitude portion 1406 of the electronic signal for a period of time can represent the binary number "1," and a sustained high magnitude portion 1408 of the electronic signal for a period of time can represent the binary number "0."

FIG. 14C shows a plot of an amplitude modulated electromagnetic signal output from the NIM fishnet 1302 in accordance with embodiments of the present invention. The high and low amplitude portions of modulated electromagnetic signal correspond to the low and high magnitude portions of the electronic signal shown in FIG. 14B. In other words, the NIM fishnet 1302 can be configured so that the effective refractive index is small for low magnitude portions of the electronic signal and relatively larger for high magnitude portions of the electronic signal. Thus, a relatively high amplitude portion 1410 corresponds to a small refractive index and a low magnitude portion 1406 of the electronic signal, and a relatively low amplitude portion 1412 corresponds to a relatively larger effective refractive index and a high magnitude portion 1408 of the electronic signal, respectively. In other embodiments, the NIM fishnet 1302 can be configured so that a relatively low amplitude portion of the electromagnetic signal corresponds to a low magnitude portion of the electronic signal and relatively high amplitude portion of the electromagnetic signal corresponds to the high magnitude portion of the electronic signal.

FIG. 14D shows a plot of a phase modulated electromagnetic signal output from the NIM fishnet 1302 in accordance with embodiments of the present invention. In this embodiment, changes in the effective refractive index of the intermediate layer 1306 produce half-wavelength phase shifts that correspond to changes in the effective refractive index, as described above with reference to FIG. 8. For example, when a high magnitude portion 1408 of the electronic signal is applied to the NIM fishnet 1302, the effective refractive index of the NIM fishnet 1302 may increase introducing a half-wavelength phase shift in the carrier wave as indicated by the half-wavelength phase difference in portions 1414 and 1416 of the electromagnetic signal.

FIG. 14E shows a plot of an amplitude and phase modulated electromagnetic signal output from the NIM fishnet 1302 in accordance with embodiments of the present invention. As shown in FIG. 14E, the relatively low amplitude portions of the electromagnetic signal, such as portion 1418, can be generated as described above with reference to FIG. 14C, and the half-wavelength phase differences between the low amplitude portions and the relatively higher amplitude portions result from effective refractive index changes described above with reference to FIG. 14D.

The phase can be modulated by the applied field or with an analyzer, such as a polarization filter, and the phase can be converted to amplitude modulation. In other embodiments, the NIM fishnet 1302 can also be operated in a reflective mode. A reflected optical signal from the fishnet exhibits phase and amplitude modulation with appropriately applied electric signals.

Figure 15A:
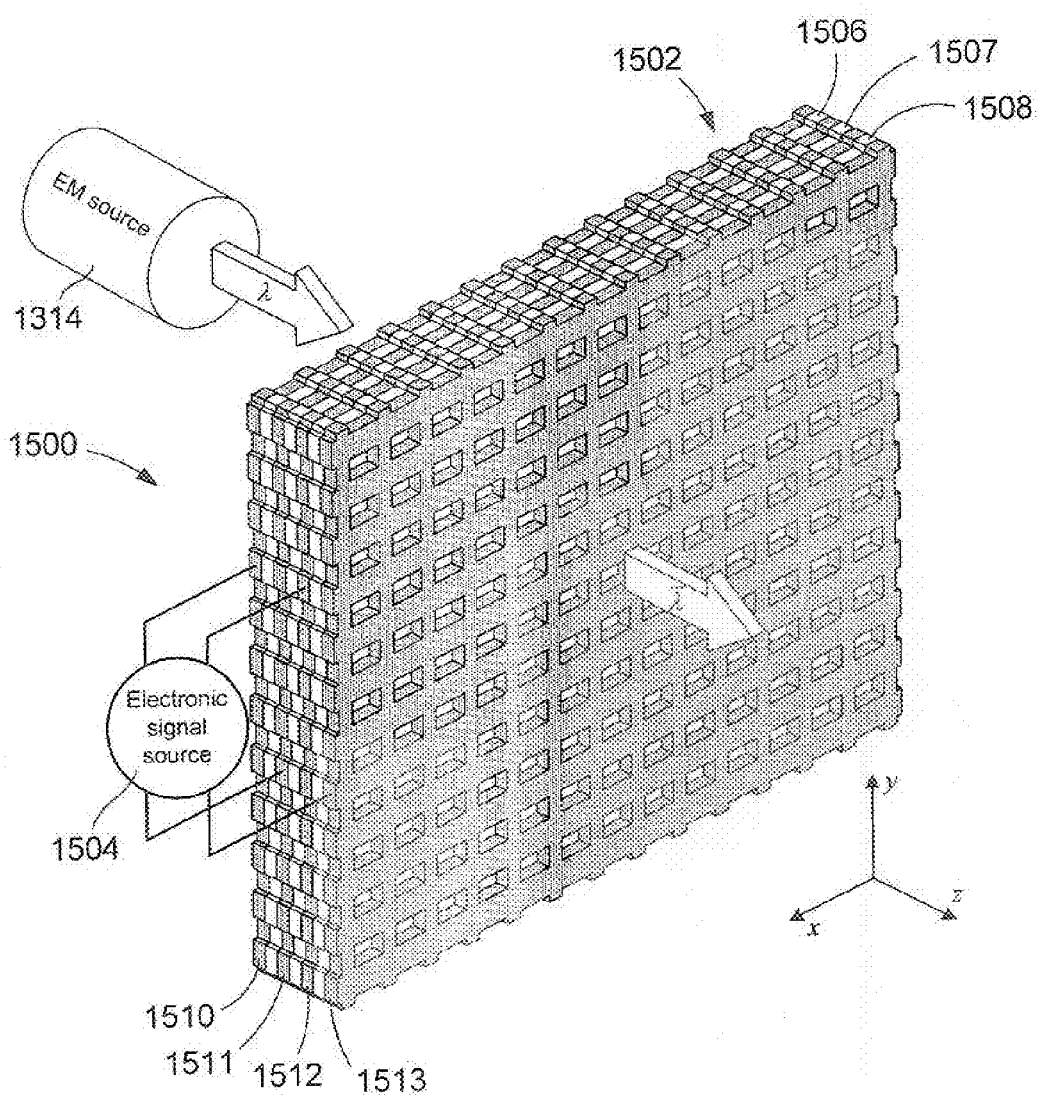
FIGS. 15A-15B show isometric and side views of an electronically controlled, multilayer negative index material modulator configured in accordance with embodiments of the present invention.
Figure 15B:
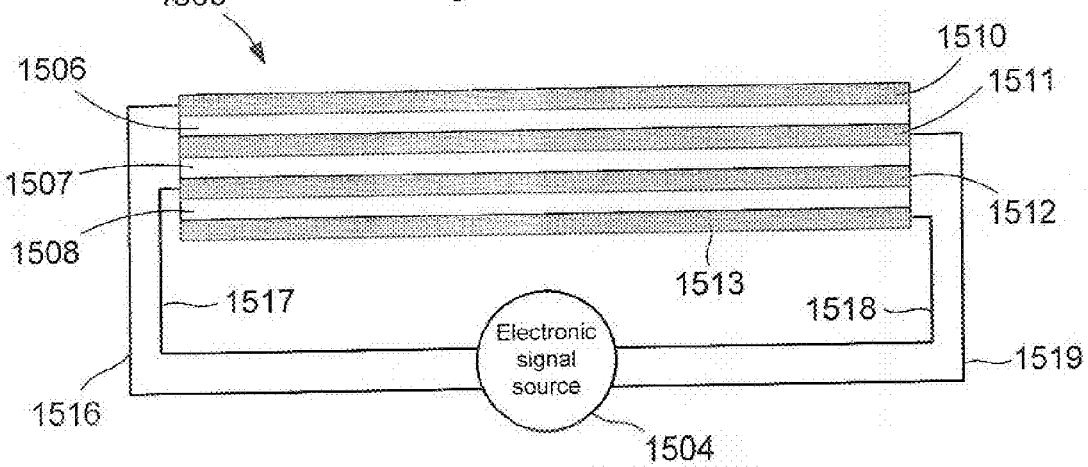

FIGS. 15A-15B show an isometric view and a side view, respectively, of an electronically controlled, multilayer negative index material modulator 1500 configured in accordance with embodiments of the present invention. The modulator 1500 comprises a stacked multi-layer NIM fishnet 1502 and an electronic signal source 1504. The NIM fishnet 1502 includes three intermediate layers 1506-1508, each intermediate layer sandwiched between a pair of conducting layers 1510-1513, such as intermediate layer 1507 sandwiched between conducting layers 1511 and 1512. The electronic signal source 1504 is in electronic communication with the conducting layers 1510-1513. The NIM fishnet 1502 includes an array of approximately regularly spaced rectangular-shaped holes 1514 extending through the layers 1506-1508 and 1510-1513. In other embodiments, the holes can be square, elliptical, circular, irregularly shaped, or any other suitable shape for forming resonance structures. As shown in FIG. 15, the electronic signal source 1504 is in electronic communication with conductive layers 1510-1513 via separate electrical contracts 1516-1519. The electronic signal source 1504 can be a driver in electronic communication with a processor, a memory controller, an electronic input port or any other electronic device that generates, stores, or transmits data in electronic signals.

FIG. 15A also shows the source 1314 emitting an unmodulated carrier wave A approximately perpendicular to the NIM fishnet 1502 surface. The carrier wave can lie within the wavelength range of interest for which the NIM fishnet 1500 has a negative effective refractive index. As the carrier wave λ is transmitted through the NIM fishnet 1502, the electronic signal source 1504 applies an electronic signal to the conducting layers 1510-1513. The electronic signal comprises a series of relatively low and high voltages or currents that shift the effective refractive index of the intermediate layers 1506-1508, as described above with reference to FIG. 13 to produce an amplitude, phase, or amplitude/phase modulated electromagnetic signal $\overline{\lambda}$, as described above with reference to FIG. 14.

Figure 16:
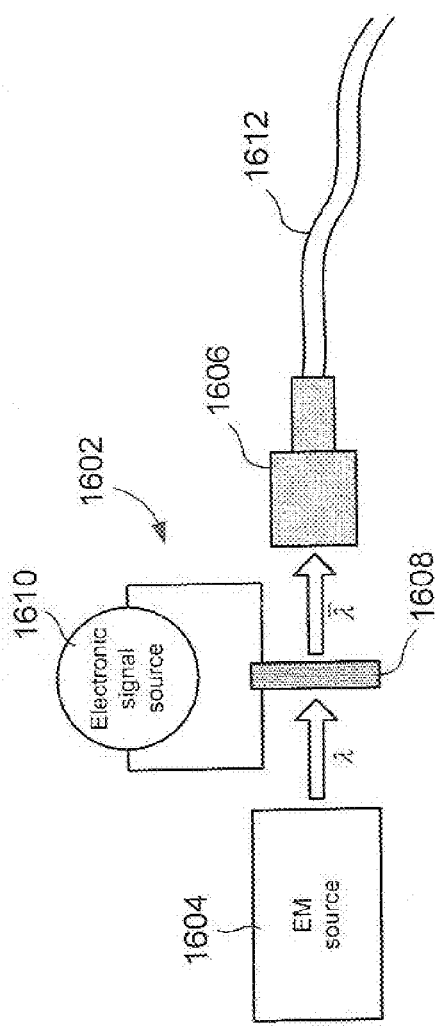
FIG. 16 shows a schematic representation of a modulator inserted between an electromagnetic radiation source and a optical fiber collimator in accordance with embodiments of the present invention.

In certain implementation embodiments, the modulators 1300 and 1500 can be implemented by simply inserting the modulators 1300 and 1500 in the path of a beam of unmodulated electromagnetic radiation in order to produce modulated electromagnetic radiation, as described above. In other embodiments, the modulators 1300 and 1500 can be implemented by inserting the modulators between an electromagnetic radiation source and an optical fiber collimator. FIG. 16 shows a schematic representation of a modulator 1602 inserted between an electromagnetic radiation source 1604 and an optical fiber collimator 1606 in accordance with embodiments of the present invention. The modulator 1602 is composed a NIM fishnet 1608 and an electronic signal source 1610. The NIM fishnet 1608 can be configured and operated as described above with reference to the NIM fishnet 1300 or the NIM fishnet 1500. The electromagnetic radiation source 1604 emits an unmodulated carrier electromagnetic wave A. Electronic signals generated by the electronic signal source 1610 shift the effective refractive index of the NIM fishnet as described above with reference to FIGS. 13 and 14 producing an electromagnetic signal $\overline{\lambda}$ encoding the same information.

The electromagnetic signal is input to optical fiber 1612 via the fiber collimator 1606, where the electromagnetic signal can be carried to a destination device for processing.

Figure 17:
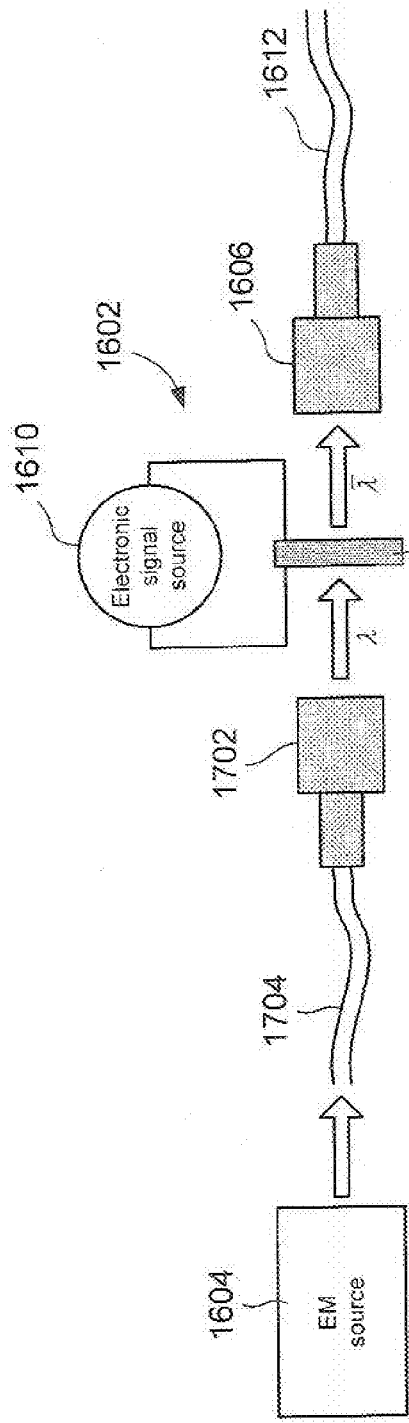
FIG. 17 shows a schematic representation of a modulator inserted between two optical fiber collimators in accordance with embodiments of the present invention.

FIG. 17 shows a schematic representation of the modulator 1602 inserted between the fiber collimator 1606 and a second optical fiber collimator 1702 in accordance with embodiments of the present invention. The electromagnetic radiation source 1604 emits an unmodulated carrier wave λ or electromagnetic radiation that is carried by an optical fiber 1704 to the fiber collimator 1702. The carrier wave is modulated by the NIM fishnet 1608 as described above with reference to FIG. 16.

Figure 18:
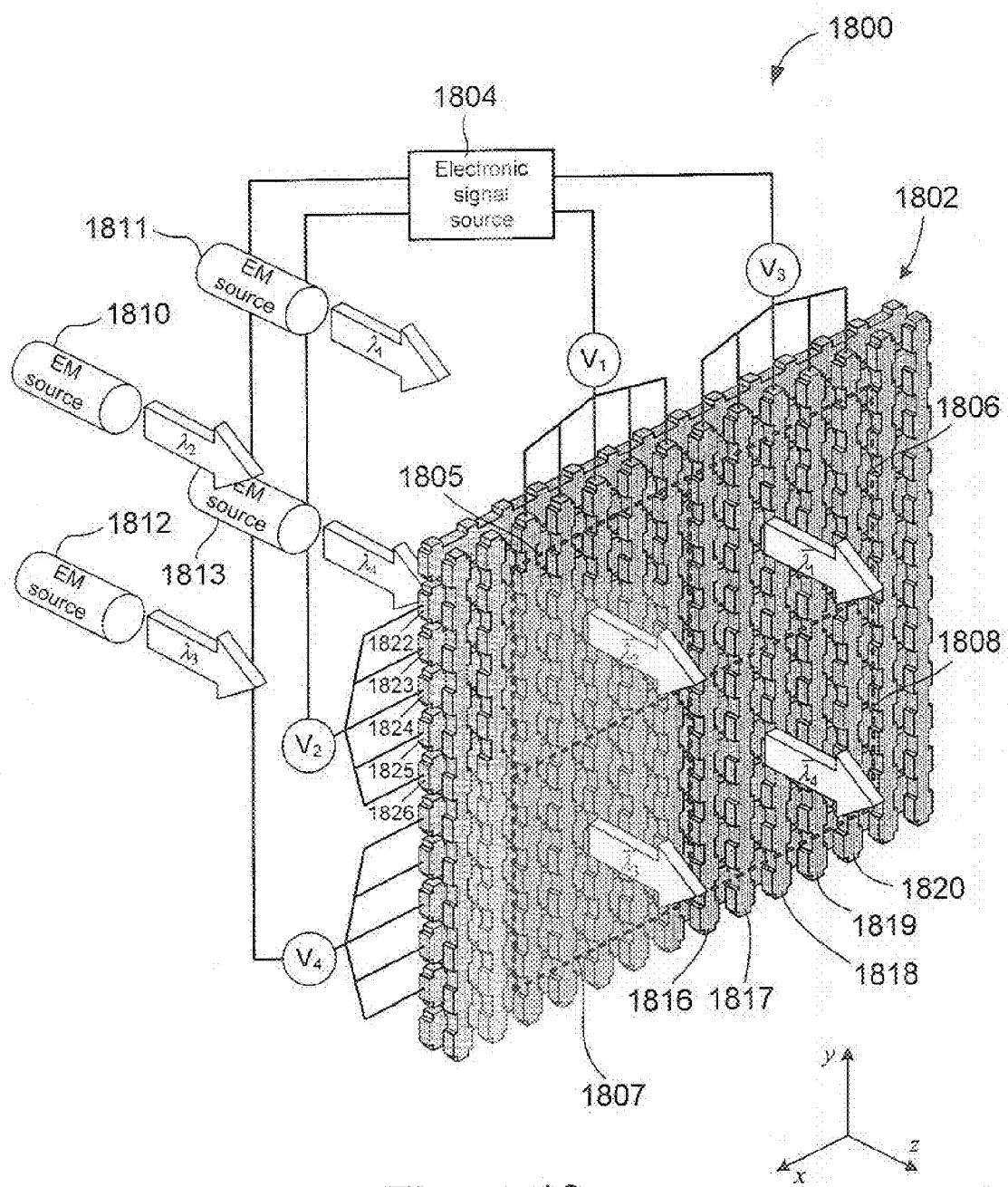
FIG. 18 shows an isometric view of an electronically controlled, negative index material multimode modulator configured in accordance with embodiments of the present invention.

In other embodiments, modulators can be configured and operated to simultaneously encode information in two or more corresponding electromagnetic signals. FIG. 18 shows an isometric view of an electronically controlled, negative index material multimode modulator 1800 configured in accordance with embodiments of the present invention. The multimode modulator 1800 comprises NIM crossbar 1802 and an electronic signals source 1804. The NIM crossbar 1802 is configured as described above with reference to FIGS. 9-12. The electronic signals source 1804 can be a driver in electronic communication with and controlled by a processor, a memory controller, an electronic input port or any other electronic device that generates, stores, or transmits data in electronic signals.

FIG. 18 reveals four phase-modulation elements 1805-1808 identified by dashed-line enclosures. The phase-modulation elements 1805-1808 are each composed of a square array of 25 resonant elements. Four electromagnetic radiation sources 1810-1813 are positioned to emit unmodulated carrier electromagnetic waves $\lambda_1, \lambda_2, \lambda_3$ and $\lambda_4$, respectively. The carrier waves $\lambda_1, \lambda_2, \lambda_3$ and $\lambda_4$ can lie within the wavelength range of interest for which the NIM crossbar 1800 has a negative effective refractive index. The carrier waves $\lambda_1, \lambda_2, \lambda_3$ and $\lambda_4$, are transmitted through phase-modulation elements 1805-1808, respectively. The phase-modulation elements 1805-1808 can be operated separately and simultaneously to encode information generated by the electronic signal source 1804 into the carrier waves $\lambda_1, \lambda_2, \lambda_3$ and $\lambda_4$ by changing the effective refractive index of the resonant elements comprising the phase-modulation elements 1805-1808. A change in the effective refractive index of a phase-modulation element is the result of changes in the effective refractive indices of the resonant elements comprising the phase-modulation element. As described above with reference to the NIM fishnet 1300, an effective refractive index change of a resonant element can be the result of changes in an oxidation or redox state, resistivity, variation in ion concentration, distribution of vacancies, injection of charge carriers under a forward or reverse bias, or any other source of refractive index change. A change in the effective refractive index of a resonant element depends on the chemical composition of the resonant element and on the magnitude and polarity of the current or voltage applied to the resonant element.

In the example shown in FIG. 18, the electronic signal sources apply voltages to the nanowires of the phase-modulation elements 1805-1808. For example, the effective refractive indices of the resonant elements comprising the phase-modulation element 1806 are changed by applying the same voltage $V_3$ to the nanowires 1816-1821 and a different voltage $V_2$ to the nanowires 1822-1825 resulting in approximately the same voltage applied across each of the 25 resonant elements of the phase-modulation element 1806. As a result, the effective refractive indices of the resonant elements comprising the phase-modulation element 1806 have approximately the same effective refractive index, and the carrier wave $\lambda_1$ is accordingly amplitude and/or phase modulated, as described above with reference to FIG. 13. The effective refractive indices of the phase-modulation elements 1805, 1807, and 1808 are separately and electronically addressed in a similar manner by applying different sets of voltages to corresponding nanowires. Thus each of the phase-modulation elements 1805-1808 can be separately operated to modulate the carrier waves $\lambda_1, \lambda_2, \lambda_3$ and $\lambda_4$ in the same manner the NIM fishnet 1300 can be operated as described above to modulate a single carrier wave λ.

Embodiments of the present invention are not limited to phase-modulation elements comprising a square array of 25 resonant elements. Because electronic signals can be applied to individual nanowires, the number of resonant elements operated to implement a phase-modulation element can range from as few as four adjacent resonant elements to hundreds or even thousands of adjacent resonant elements. In addition, the individual nanowires enable phase-modulation elements to have various shapes such as a square, a rectangular, a circle, an ellipse, a triangle, or any other suitable shape.

Figure 19:
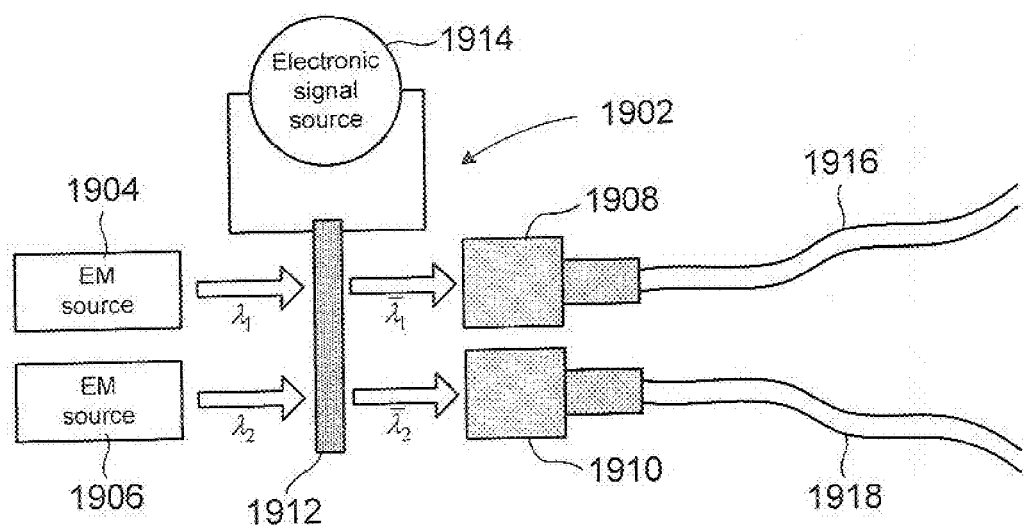
FIG. 19 shows a schematic representation of a multimode modulator inserted between two electromagnetic radiation sources and two optical fiber collimators in accordance with embodiments of the present invention.

In certain implementation embodiments, a multimode modulator can be implemented by inserting the multimode modulator between two or more electromagnetic radiation sources and one or more optical fiber collimators. FIG. 19 shows a schematic representation of a multimode modulator 1902 inserted between two electromagnetic radiation sources 1904 and 1906 and two fiber collimators 1908 and 1910 in accordance with embodiments of the present invention. The multimode modulator 1902 is composed a NIM crossbar 1912 and an electronic signal source 1914. The NIM crossbar 1912 can be configured and operated as described above with reference to the NIM crossbar 1802. In this example, the multimode modulator 1902 is operated to modulate only two unmodulated carrier waves $\lambda_1$ and $\lambda_2$ emitted from electromagnetic radiation sources 1904 and 1906, respectively. The unmodulated carrier waves $\lambda_1$ and $\lambda_2$ enter two separate phase-modulation elements of the NIM crossbar 1912. Electronic signals generated by the electronic signal source 1915 shift the effective refractive index of the phase-modulation elements of the NIM crossbar 1912, producing two corresponding electromagnetic signals $\overline{\lambda}_1$ and $\overline{\lambda}_1$ that are input to optical fibers 1916 and 1918 via the fiber collimators 1908 and 1910. The electromagnetic signals can be carried in separate fibers 1916 and 1918 to different devices for processing.

Figure 20:
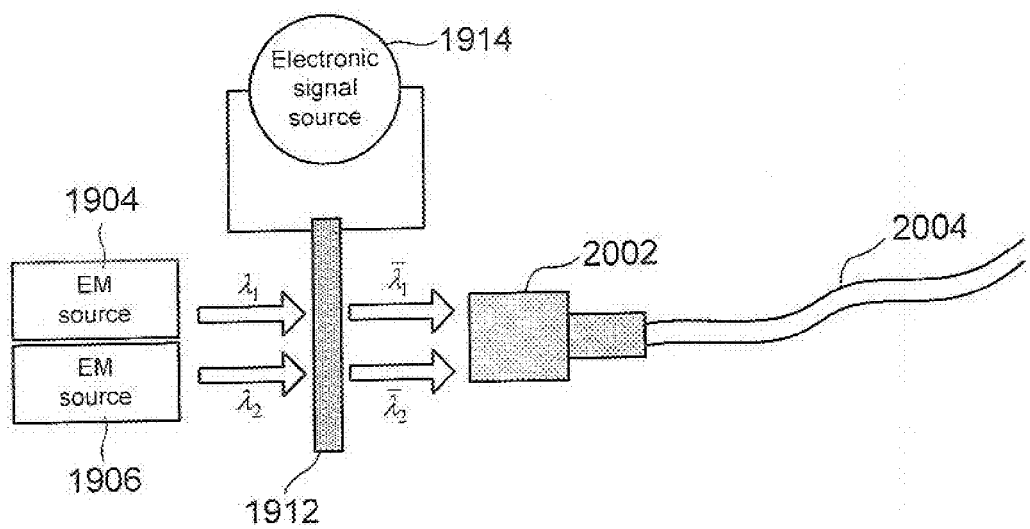
FIG. 20 shows a schematic representation of a multimode modulator inserted between two electromagnetic radiation sources and a single optical fiber collimator in accordance with embodiments of the present invention.

FIG. 20 shows a schematic representation of a multimode modulator 1902 inserted between two electromagnetic radiation sources 1904 and 1906 and a single fiber collimator 2002 in accordance with embodiments of the present invention. The electromagnetic signals $\overline{\lambda}_1$ and $\overline{\lambda}_1$ are generated as described above with reference to FIG. 19 and input the fiber collimator 2002, which is coupled to a multimode optical fiber 2004. The electromagnetic signals $\overline{\lambda}_1$ and $\overline{\lambda}_1$ can be carried in the fiber 2004 to a device for processing.

Figure 21:
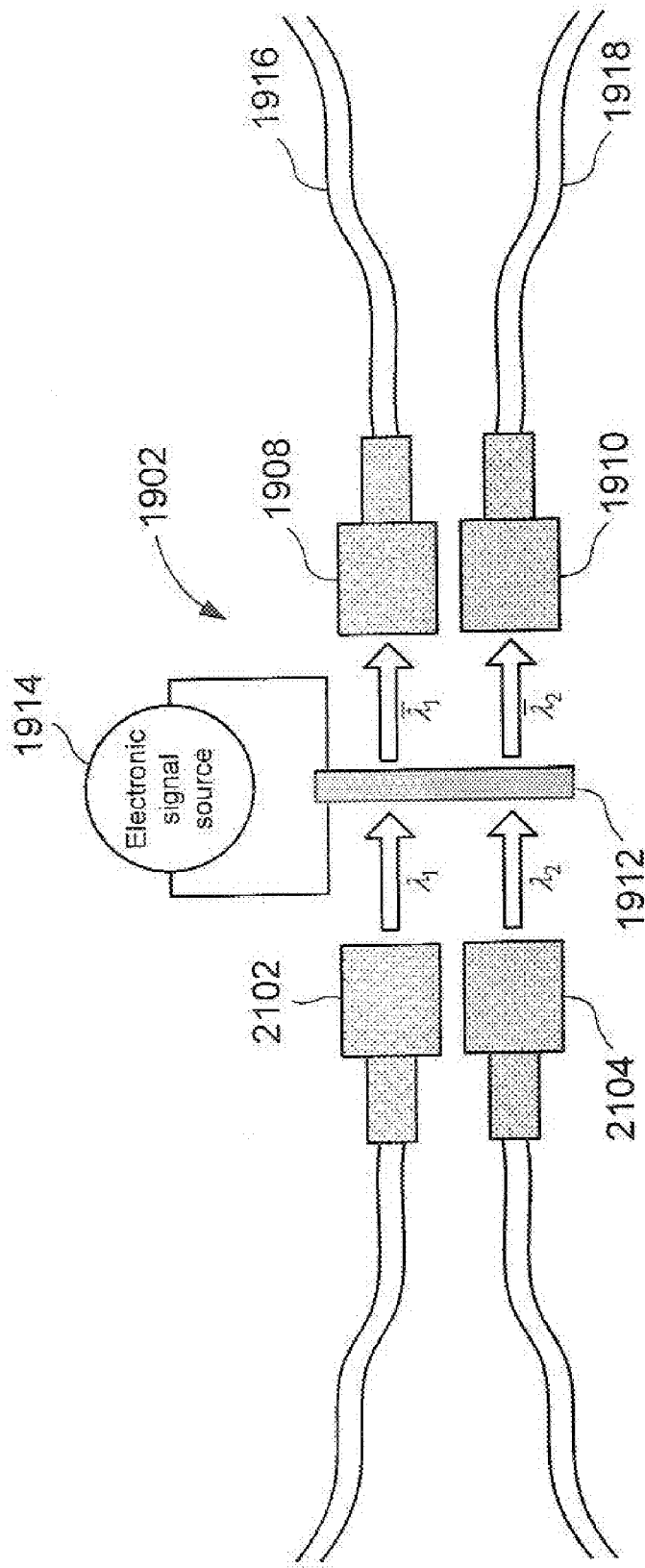
FIG. 21 shows a schematic representation of a multimode modulator inserted between two sets of optical fiber collimators in accordance with embodiments of the present invention.

FIG. 21 shows a schematic representation of the modulator 1902 inserted between two input fiber collimators 2102 and 2104 and fiber collimators 1908 and 1910 in accordance with embodiments of the present invention. The unmodulated carrier waves $\lambda_1$ and $\lambda_2$ are input to the NIM crossbar 1912, modulated, and output in fiber collimators 1908 and 1910, as described above with reference to FIG. 19.

Fabrication Methods

Figure 22A:
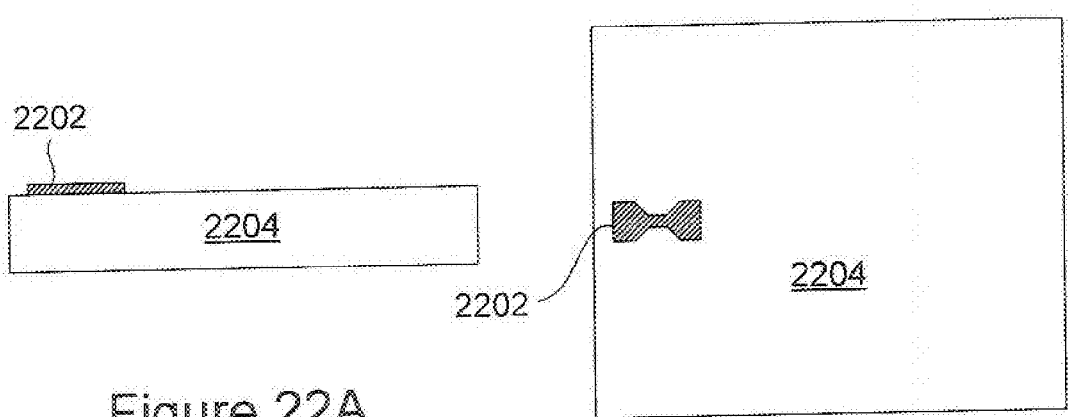
FIGS. 22A-22F show views associated with a method of fabricating the microresonator system, shown in FIG. 13, in accordance with embodiments of the present invention.

FIGS. 22A-22F show views that are associated with a method of fabricating the microresonator system, shown in FIG. 13, in accordance with embodiments of the present invention. FIG. 22A shows an electrode 2202 disposed on the top surface of a substrate 2204. The substrate 2204 can be composed of quartz or glass, and the electrode 2202 is composed of a conductive material, such as Au, Ag, Cu, Al, Pt, or any other suitable electronically conductive material. The electrode 2202 is formed by first depositing a layer of a conductive metal on the surface of the substrate 2204 using molecular beam epitaxy ("MBE"), liquid phase epitaxy ("LPE"), hydride vapor phase epitaxy ("HVPE"), metalorganic vapor phase epitaxy ("MOVPE"), sputtering, electron-beam evaporation or another suitable deposition method. Next, the shaped of the electrode 2202, shown in FIG. 22, can obtained by reactive ion etching ("RIE"), chemically assisted ion beam etching ("CAIBE"), or inductively coupled plasma ("ICP").

Figure 22B:
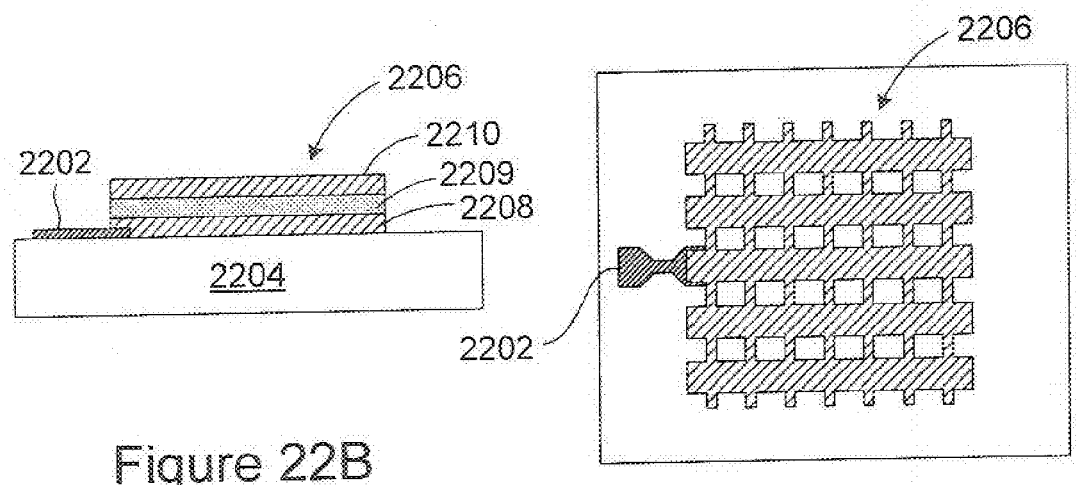

Next, as shown in FIG. 22B, a NIM fishnet structure 2206 is formed by depositing a first conductive layer 2208, a layer 2209, and a second conductive layer 2210 using MBE, LPE, HVPE, MOVPE, or any other suitable deposition technology In other embodiments, the layers 2208-2210 can be deposited using wafer bonding. The layer 2209 can be composed of a dielectric material, such as silicon dioxide ("SiO$_2$") or aluminum oxide ("Al$_2$O$_3$"), or the layer 2209 can be composed of an electro-optical material, such as silicon ("Si"), lithium niobate ("LiNbO$_3$"), or titanium dioxide ("TiO$_{2-x}$") The NIM fishnet structure can be obtained by mechanical nanoimprinting the pattern in the layers 2208-2210 using a pre-fabricated mold. In other embodiments, the hole pattern can be obtain by RIE, focusing beam milling ("FBM"), CAIBE, or ICP.

Figure 22C:
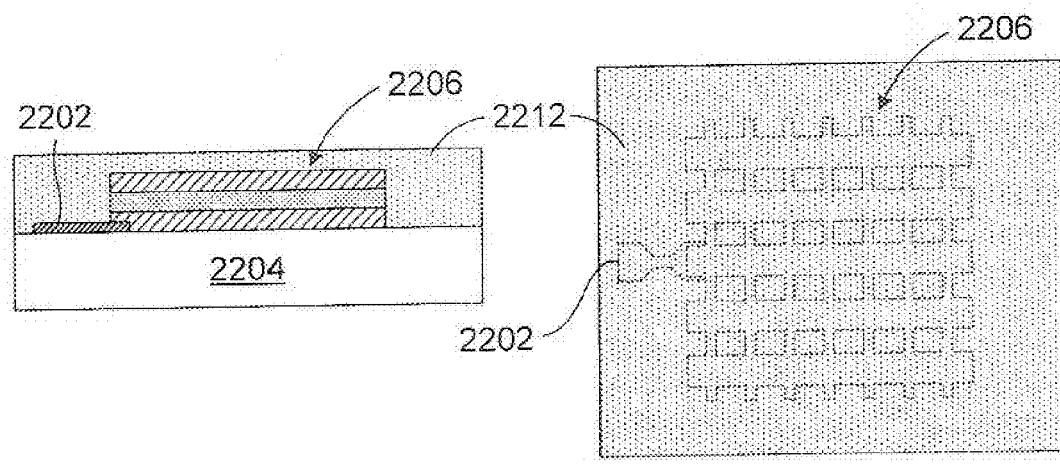

Next, as shown in FIG. 22C, a transparent dielectric layer 2212 is deposited over the electrode 2202 and the NIM fishnet 2206. The dielectric layer 2212 can be composed of SiO$_2$, Si$_3$N$_4$, or another suitable dielectric material. Next, a chemical mechanical polishing ("CMP") processes may be used to planarize the top surface of the deposited layer 2212.

Figure 22D:
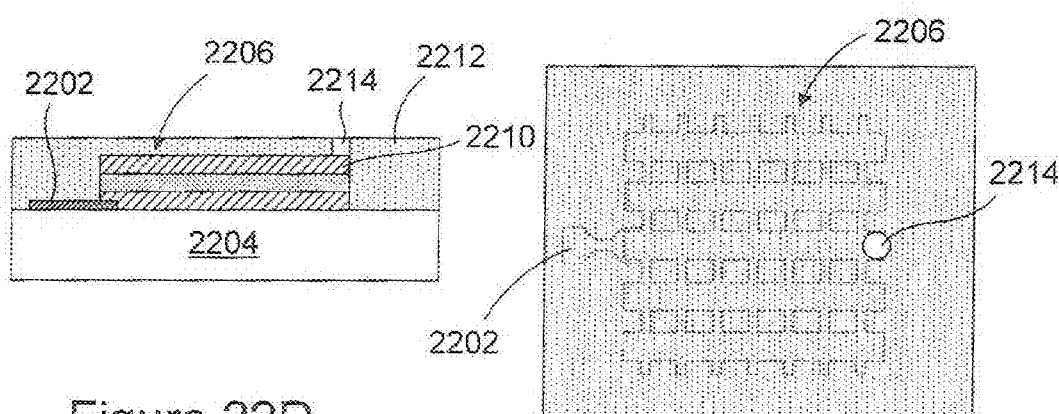

Next, as shown in FIG. 22D, an aperture 2214 is formed in the dielectric layer 2212 exposing a portion of the layer 2210. The aperture 2214 can be formed using mechanical nanoimprinting, RIE or FBM.

Figure 22E:
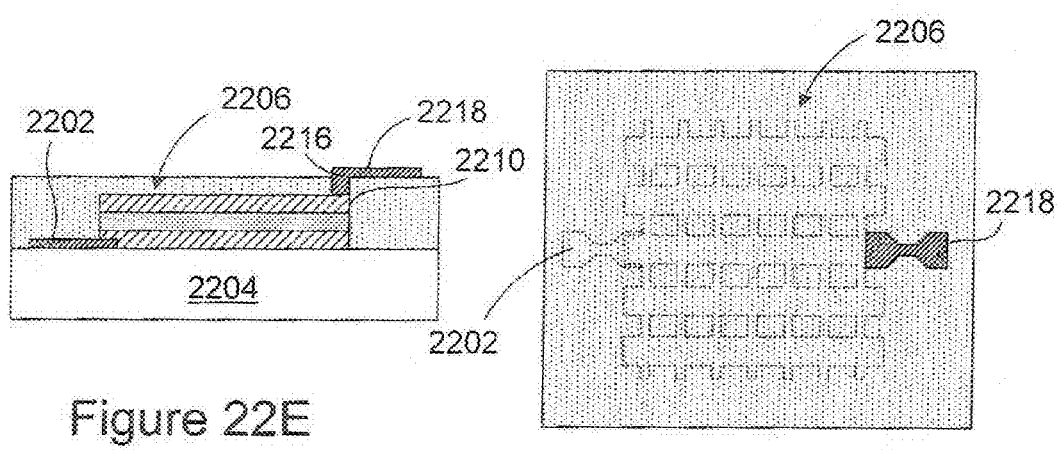

Next, as shown in FIG. 22E, the aperture 2214 is filled with a conductive material 2216 and is deposited on the exposed surface of the dielectric layer 2212. The shaped of the electrode 2214 can be obtained using RIE, CAIBE, or ICP.

Figure 22F:
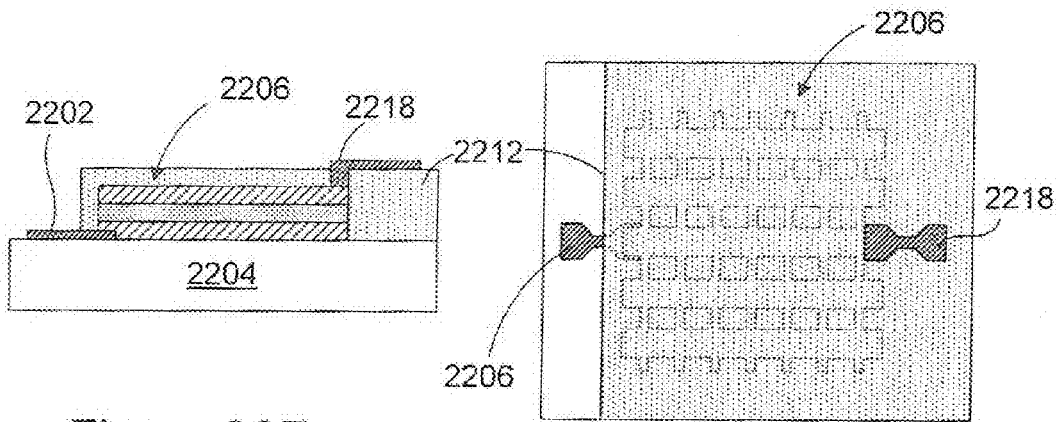

Next, as shown in FIG. 22F, a portion of the electrode 2202 is exposed by removing a portion of the dielectric layer 2213 using RIE, FBM, CAIBE, or ICP.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An external modulator comprising:
   a negative index material in electronic communication with an electronic signal source, the negative index material to receive an electronic signal encoding data from the electronic signal source and an unmodulated carrier wave from an electromagnetic radiation source, wherein magnitude variations in the electronic signal are to produce corresponding effective refractive index changes in the negative index material to encode the data in amplitude and/or phase of the carrier wave to produce an electromagnetic signal.

2. The modulator of claim 1 wherein the negative index material further comprises a fishnet structure having
   a first conductive layer;
   a second conductive layer; and
   an intermediate layer sandwiched between the first and second conductive layers, wherein the fishnet structure includes an array of approximately regular spaces holes, each hole extending through the first and second layers and the intermediate layer.

3. The modulator of claim 2 wherein the intermediate layer further comprises a dielectric material.

4. The modulator of claim 2 wherein the intermediate layer further comprises a electro-optical material.

5. The modulator of claim 2 wherein the holes further comprise a rectangular shape, a square shape, an elliptical shape, a circular shape, or an irregular shape.

6. The modulator of claim 2 further comprises resonant structures between adjacent holes, each resonant structure including a wide portion of fishnet structure material and a relatively narrower portion of fishnet structure material.

7. The modulator of claim 2 wherein the first and second conductive layer further comprise conductive metal.

8. The modulator of claim 2 wherein the first and second conductor layer further comprise a heavily doped semiconductor.

9. The modulator of claim 1, wherein the negative index material further comprises:
   a first layer of non-crossing approximately parallel nanowires, each nanowire having substantially regularly spaced fingers;
   a second layer of approximately parallel nanowires that overlay the nanowires in the first layer, each nanowire having substantially regularly spaced fingers, wherein the nanowires in the first layer are approximately perpendicular in orientation to the nanowires in the second layer; and
   resonant elements at nanowire intersections, wherein each resonant element includes two fingers of a nanowire in the first layer and two fingers of a nanowire in the second layer.

10. The modulator of claim 9 wherein the intermediate layer further comprises a dielectric material.

11. The modulator of claim 9 wherein the intermediate layer further comprises a electro-optical material.

12. The modulator of claim 9 wherein the first and second conductive layer further comprise conductive metal.

13. The modulator of claim 9 wherein the first and second conductor layer further comprise a heavily doped semiconductor.

14. The modulator of claim 1 wherein the electronic signal source further comprises a driver in electronic communication with a processor, a memory controller, an electronic input port or any other electronic device that generates, stores, or transmits data in electronic signals.

* * * * *